United States Patent [19]

Cornell et al.

[11] Patent Number: 4,663,713
[45] Date of Patent: May 5, 1987

[54] AUTOMATIC POWER CONTROL FOR VARIABLE POWER TRAIN

[75] Inventors: Charles R. Cornell; David J. Olson, both of Naperville, Ill.

[73] Assignee: J. I. Case Company, Racine, Wis.

[21] Appl. No.: 620,762

[22] Filed: Jun. 14, 1984

Related U.S. Application Data

[63] Continuation-in-part of Ser. No. 582,192, Feb. 21, 1984.

[51] Int. Cl.⁴ .................. B60K 41/20; F02D 41/00
[52] U.S. Cl. .................. 364/424.1; 74/625; 200/61.88; 123/361
[58] Field of Search .......... 74/625, 491; 200/61.85, 200/61.88, 153 T; 123/357, 359, 361, 399; 364/424.1

[56] References Cited

U.S. PATENT DOCUMENTS

| | | | |
|---|---|---|---|
| 2,476,652 | 7/1949 | Black | 123/361 |
| 2,612,965 | 10/1952 | Christie | 123/361 |
| 3,363,480 | 1/1968 | Murphy | 74/625 |
| 3,914,938 | 10/1975 | Cornell et al. | |
| 3,952,829 | 4/1976 | Gray | |
| 4,091,372 | 5/1978 | Blaha et al. | 200/61.88 |
| 4,091,617 | 5/1978 | Cornell | |
| 4,158,290 | 6/1979 | Cornell | |
| 4,180,979 | 1/1980 | Cornell | |
| 4,181,103 | 1/1980 | Sturdy | 123/361 |
| 4,523,565 | 6/1985 | Omitsu | 123/399 |
| 4,567,786 | 2/1986 | Sakurai | 74/491 |

FOREIGN PATENT DOCUMENTS

0122742  7/1984  Japan .................. 123/399

OTHER PUBLICATIONS

S.A.E. Paper No. 780465 "Hydrostatic Transmission Controls—is There Space for Optimization" Zarotti, Nervegna, and Miotto, Apr. 1978.
"Earth Movers Dig into Computers" *Truck and Off-Highway Industries*, Jan./Feb., 1983.

*Primary Examiner*—Parshotam S. Lall
*Attorney, Agent, or Firm*—Cullen, Sloman, Cantor, Grauer, Scott & Rutherford

[57] ABSTRACT

Microprocessor controlled automatic power control for adjusting the engine power setting in an engine-transmission power train in which the transmission drive reduction is variable in ratio, by step change or continuously so, such as for use in farm tractors. The microprocessor control monitors the position of this automatically moving lever and the desired transmission output speed to keep the setting adjusted so that engine power is set, within a deadband, to maintain a desired engine speed preferably resulting in minimum fuel consumption or in maintaining constant transmission output speed. Preferably, the microprocessor has a higher priority primary function of also automatically adjusting the transmission drive reduction ratio, for the same purpose but with higher sensitivity. The power control lever is specifically designed to automatically return the power setting to manual control as soon as the operator grabs the handle.

8 Claims, 15 Drawing Figures

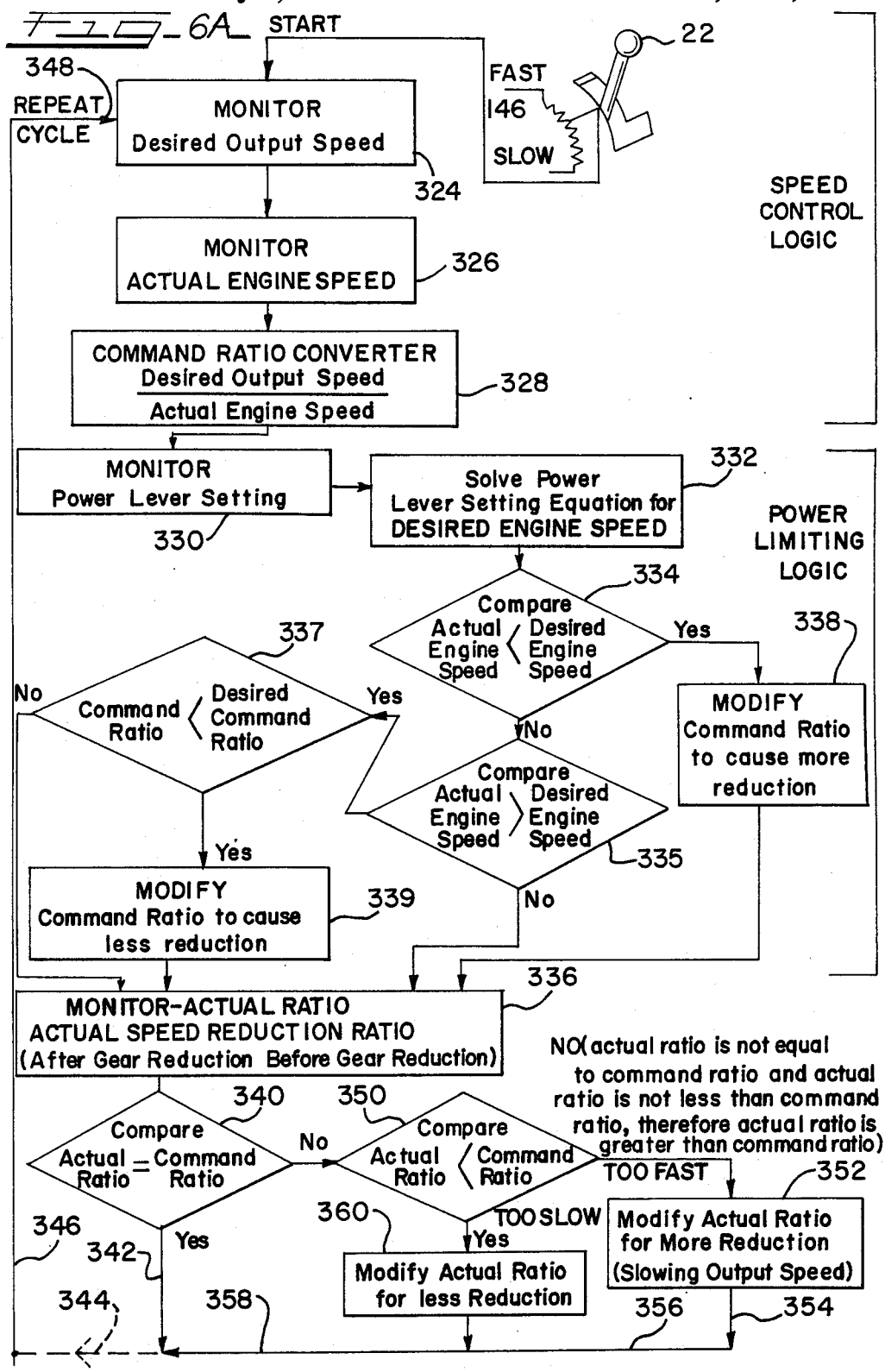

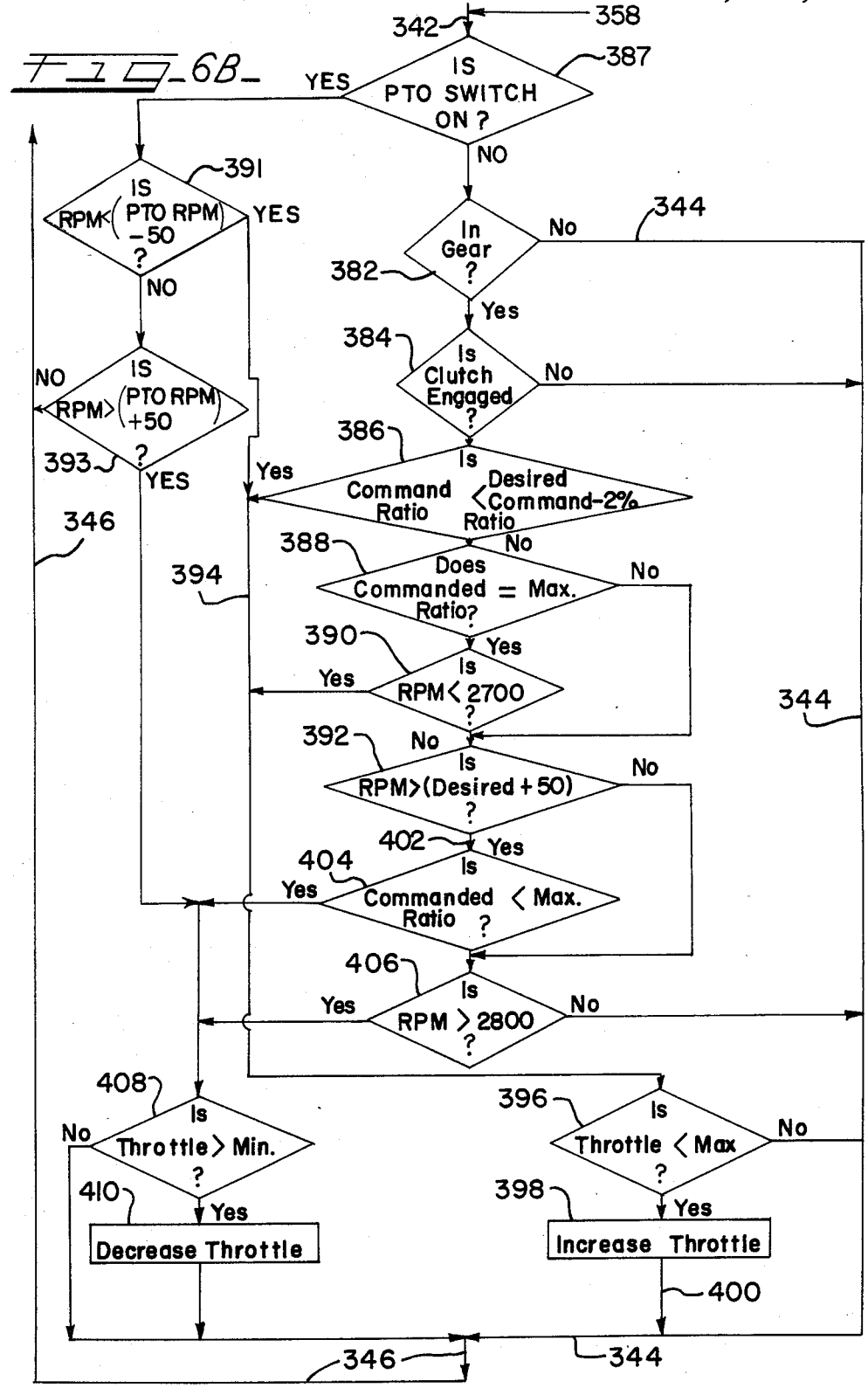
FIG_6B

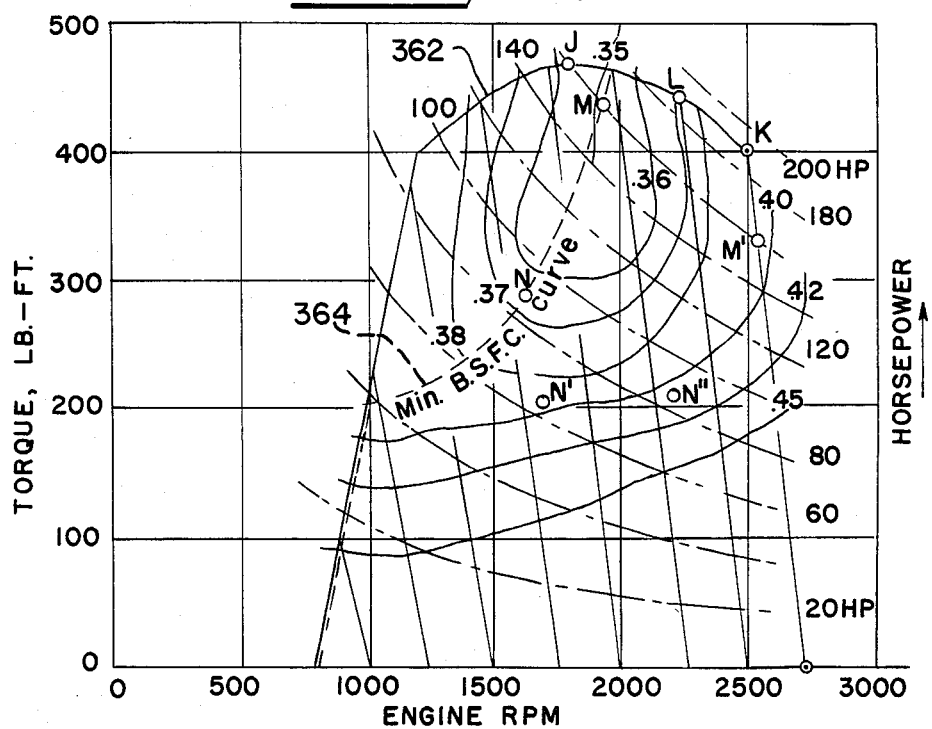
FIG-7A-
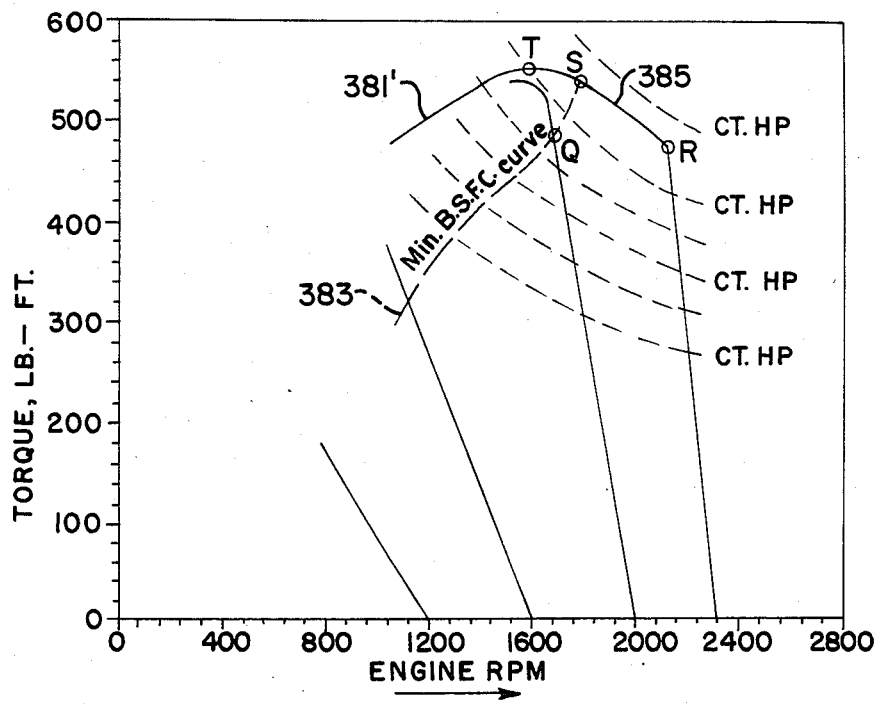
FIG-7B-

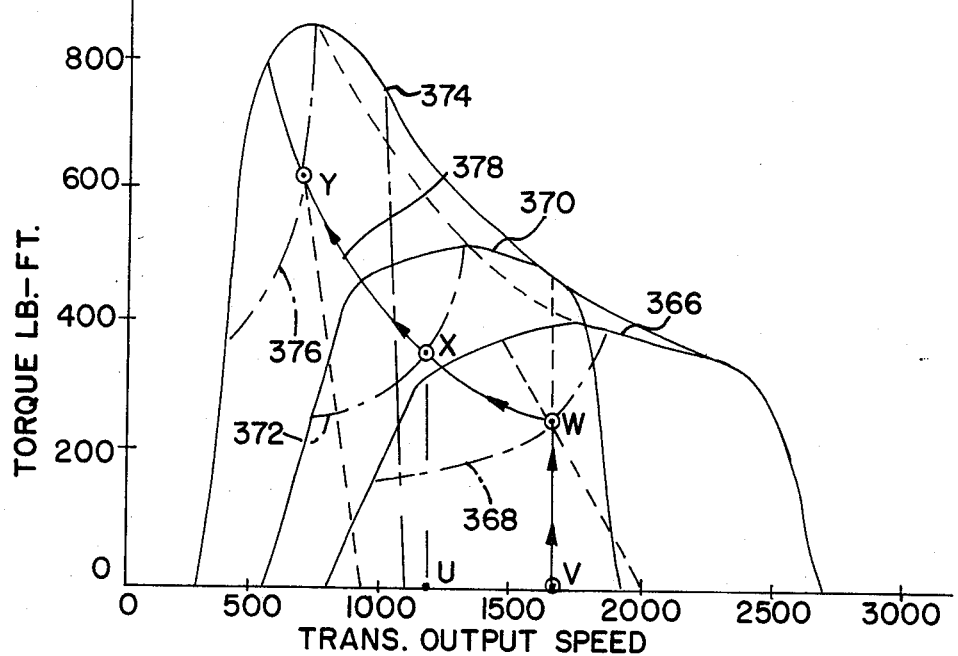
FIG_8A_
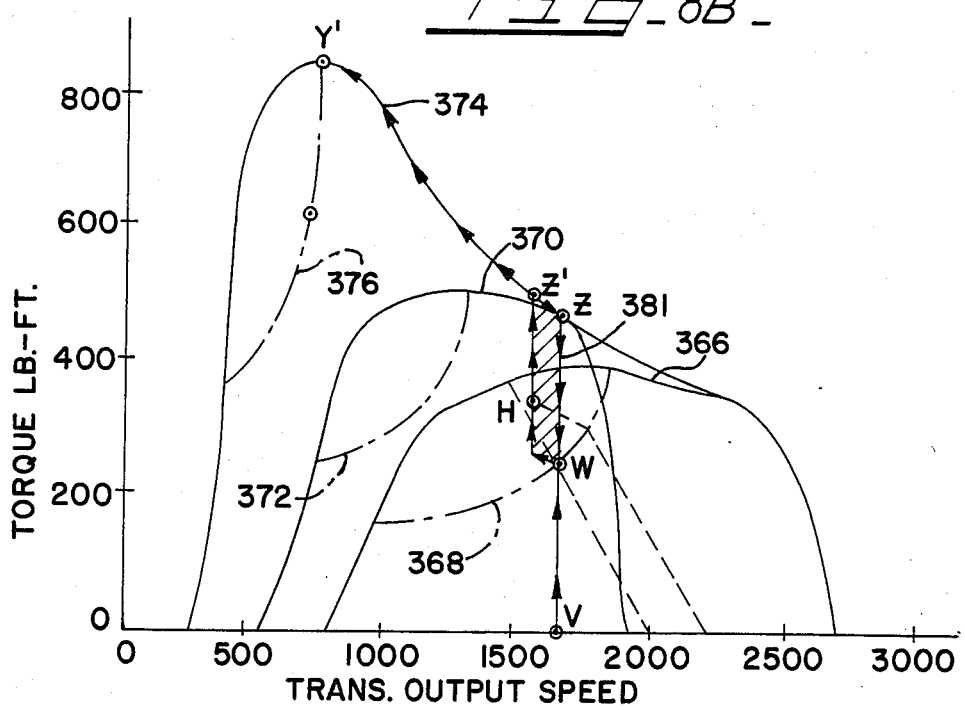
FIG_8B_

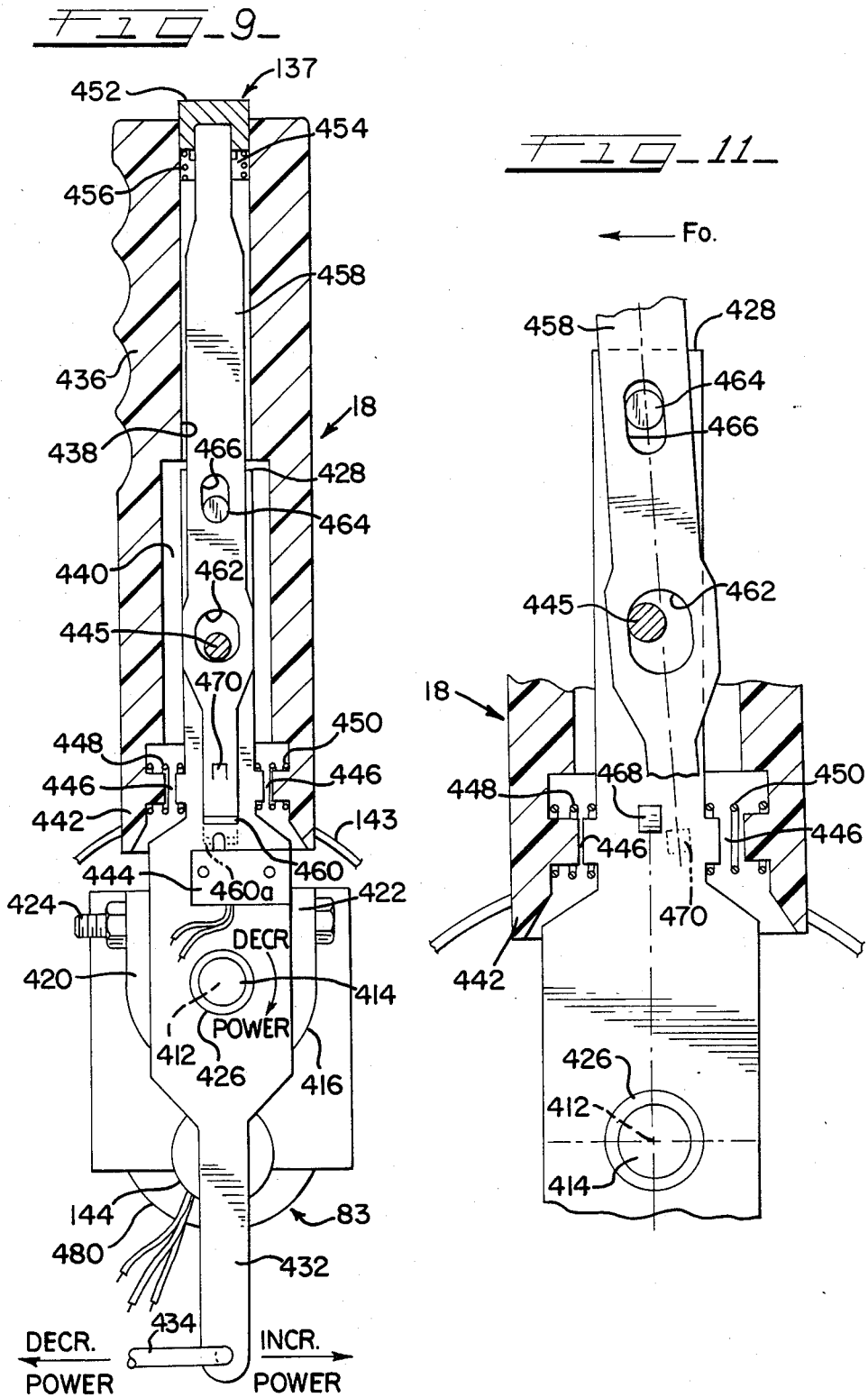

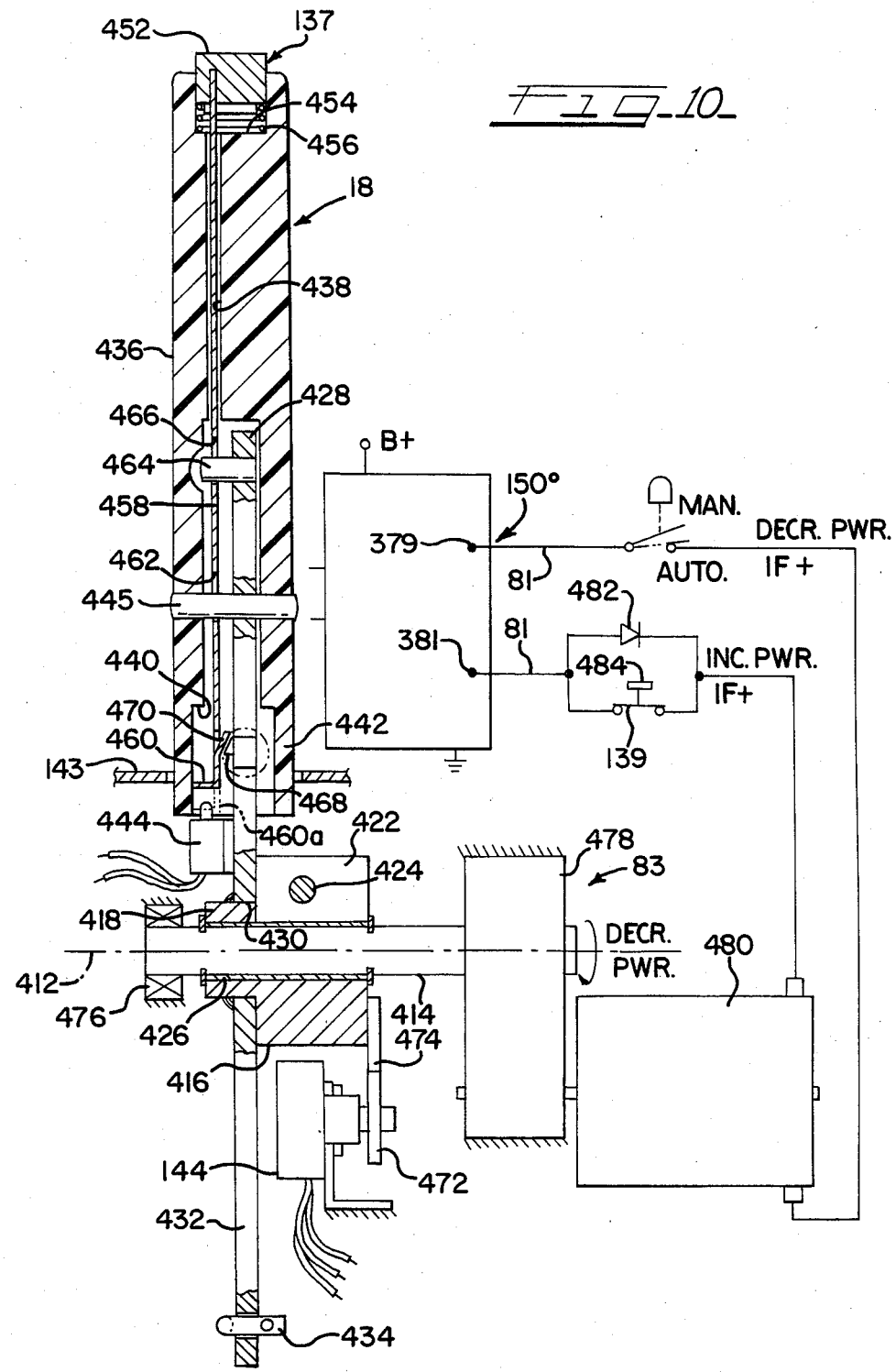

AUTOMATIC POWER CONTROL FOR VARIABLE POWER TRAIN

CROSS REFERENCE TO RELATED CASES

This application is a continuation-in-part of U.S. patent application Ser. No. 582,192 filed Feb. 21, 1984 by the inventors hereof and is related to coassigned U.S. patent application of Cornell, Ser. No. 512,832 filed July 11, 1983, now U.S. Pat. No. 4,594,666, relating to a power train automatic transmission controls. This application embellishes the machinery of the power train with a power lever especially adapted for closely monitored automatic movement, hands off, in setting the engine power and is preferably used in conjunction with, the automatic transmission controls disclosed in the above-identified Cornell patent applications.

This application further is a companion case to respectively coassigned U.S. Pat. No. 4,138,907 and Hennessey et al. U.S. Pat. No. 4,388,987 granted June 21, 1983, the power train disclosures of both of which are incorporated in their entirety herein by reference.

BACKGROUND OF THE INVENTION

The present invention is energy related, for the purpose of fuel conservation. It automatically controls, as one part and only augmentally so, the hand lever for setting engine power and further controls, as one part, the effective drive reduction ratio of a power train having a continuously variable or step change transmission, such as broadly used in agricultural and nonagricultural vehicles and machinery, especially an agricultural tractor.

The invention specifically utilizes an engine and transmission, dual function monitor/control microprocessor for a variable ratio power train drive, primarily effective to automatically adjust both the transmission ratio and the power setting so that engine power at all levels is produced at a brake specific fuel consumption (BSFC) of substantially minimum pounds (or Kg) of fuel per horsepower hour (or KWH). The power hand lever or handle may move as a visible indication of the power setting being made automatically, but the companion transmission output speed lever has no power drive connection to reset it and hence remains in its hand-set positions.

As background thereto, the material information includes but is not limited to U.S. Pat. Nos. 3,952,829, 4,180,979, 4,091,617, 4,158,290, and especially the (U.S.) Society of Automotive Engineers Paper No. 780465 relating to BSFC and also U.S. Pat. No. 3,914,938.

SUMMARY OF THE INVENTION

An object of the invention, therefore, is to consistently achieve substantially minimum or optimum brake specific fuel consumption in a self-powered vehicle, automatically by means of an engine and transmission monitor/digital-control microprocessor provided for a continuously variable or step change power train therein.

Another object of the invention, providing for anti-lugging protection of the engine under a worsening load condition, is accomplished by automatically causing the speed transmission to progressively vary from essentially a 1:1 drive ratio to greater ratios and finally a maximum speed reduction ratio as the condition progressively increases rimpull loading. This objective is also accomplished secondarily at the same time by automatically causing the fuel rate of flow to increase and increase the power being made available from the engine. Under normal load conditions, the engine never lugs, being afforded more torque advantage by the speed transmission as indicated and perhaps at the same time more fuel depending on the amount of engine speed or transmission ratio deviation from the optimum.

An additional object is the employment of the monitor/control microprocessor and its memory so as to provide thereto a data base for the engine comprising a predetermined consecutive series of desired engine speed values productive of substantially minimum brake specific fuel consumption for a range of power settings, and thereupon repetitively determining in the microprocessor, at frequent intervals, the desired minimum brake specific fuel consumption speed for the current power lever setting, thus constantly updating the objective of the system, always under easy access to the system, and ever present for due reference and response by the system. The provision of the data base is by simply a matter of known choices, namely, by table, or by other procedure such as an approximation equation.

An additional object, in line with the foregoing objective, resides in the provision of a specially adapted automatic power lever and a microprocessor-controlled governor and motor drive linkage therefor, together effective to make adjustments in governor settings of the engine whereby the fuel flow is at a rate always productive of optimum specific fuel consumption.

Another object is to make provision for such automatic power lever in an intermediate position between the governor motor drive and its controlled governor settings, thus affording to the driver an intervening hand control overriding all automatic control of the power lever and restoring the operation exclusively to his full discretion and judgment.

A further object of the invention is to provide an automatic power lever such as the foregoing which the driver can readily set in MANUAL for intervening control and just as readily set on AUTOMATIC when he wishes to be relieved from having taken on the added control duty for himself.

A still further object of the invention is to provide for a separate automatic PTO operating mode maintaining the engine speed at a desired PTO operating speed while utilizing the same automatic power lever controls.

A more specific object is to provide structure for such power lever including a handle assembly carrying a two-position, trippable push button out-projecting when the power lever is set for MANUAL, and depressible to set same for AUTOMATIC. An outer handle is capable of limited pivotal movement relative to the inner portion of the jointly pivoting assembly, the governor control lever, which is connected to the drive motor. The push button in the handle is adapted to trip upon initial relative pivotal movement of the handle and immediately put the power lever and the engine power control system back under the exclusive manual control of the driver.

The invention is specifically embodied in a power train including an engine and a range transmission and, between the engine and range transmission, a hydromechanical speed transmission equipped with pump and motor hydraulic units with variable displacement to vary the transmission ratio infinitely within limits. The range transmission has three or more speed ranges, at least some of which overlap, with infinitely variable speed characteristics because of the just mentioned speed transmission adjustments, incrementally ranging all the way from nominal speed afforded by the speed transmission reduction to much more speed reduction at a substantial ratio.

The power train is further provided with the engine included therein being adapted for automatica close control of available power and operating speed, the aforesaid automatically controlled engine power lever assembly for operating the engine and having a plurality of operating positions, an operator controlled speed lever establishing a desired transmission output speed of said power train, a plurality of sensors for respectively sensing engine or transmission input speed, transmission output speed, power lever position, and speed lever position, an apparatus for automatically controlling the ratio of the transmission, and for automatically controlling the position of the power lever in response to said sensors, the control apparatus having a dedicated microprocessor programmed to establish a desired engine speed according to a power match curve, preferably corresponding to the least specific fuel consumption of said engine, based on the position of the power lever, and, based on the position of the speed lever, vary the ratio of said transmission to maintain the desired engine speed upon increases in drive train load beyond that producing the desired engine speed for the specific power lever setting and to maintain the desired transmission output speed upon decreases in drive train load beyond that producing the desired engine speed for the specific power lever setting, said microprocessor further being programmed to establish a deadband in which the engine speed can exceed the desired speed without additional effect and upon the engine speed exceeding the deadband causing a decrease in the power lever setting thereby establishing a new desired engine speed, the microprocessor being still further programmed to establish a deadband in which the ratio of the transmission can be reduced without additional effect and upon the transmission ratio being reduced beyond the deadband, actuating the power lever to increase the power setting thereby increasing the desired engine speed while maintaining the desired transmission output speed.

In the automatic PTO mode, the microprocessor maintains the engine speed within a deadband above and below a desired PTO operating speed while varying the transmission ratio, if the tractor drive is in use, as above, to maintain least fuel consumption or constant output speed.

DESCRIPTION OF THE DRAWINGS

Further features, objects, and advantages will either be specifically pointed out or become apparent when, for a better understanding of the invention, reference is made to the following description, taken in conjunction with the accompanying drawings which show certain preferred embodiments thereof and in which:

FIG. 6A is a block diagram sequencing those operating steps which the automatic transmission control is programmed to follow, and complementary FIG. 6B delineates the corresponding diagram for the automatic power control;

FIG. 7A is an engine rpm-torque graph showing rated power torque, with superposed plots thereon of the governor droop curves, constant BSFC loops, and the discerned pattern of least BSFC points, the locus of which generates a single discrete minimum BSFC curve, and FIG. 7B is a similar curve for a different engine;

FIG. 8A is a transmission rpm-torque graph showing rated power torque for three arbitrary but representative transmission gear reduction ratios, each with its individual superposed least BSFC curve, and the discerned pattern of least BSFC points, the locus of which generates a discrete single line anti-lug curve, representative of manual throttle control operation, and FIG. 8B is the complementary graph which illustrates a representative drive train curve with the automatic power control feature;

FIGS. 9 and 10 are respective left side and rear elevational views of the automatic power lever; and FIG. 11 is another left side elevational view, like FIG. 9 but showing the lever only fragmentarily, in a different operating position, and to enlarged scale.

A PREFERRED EMBODIMENT

Figure 1:
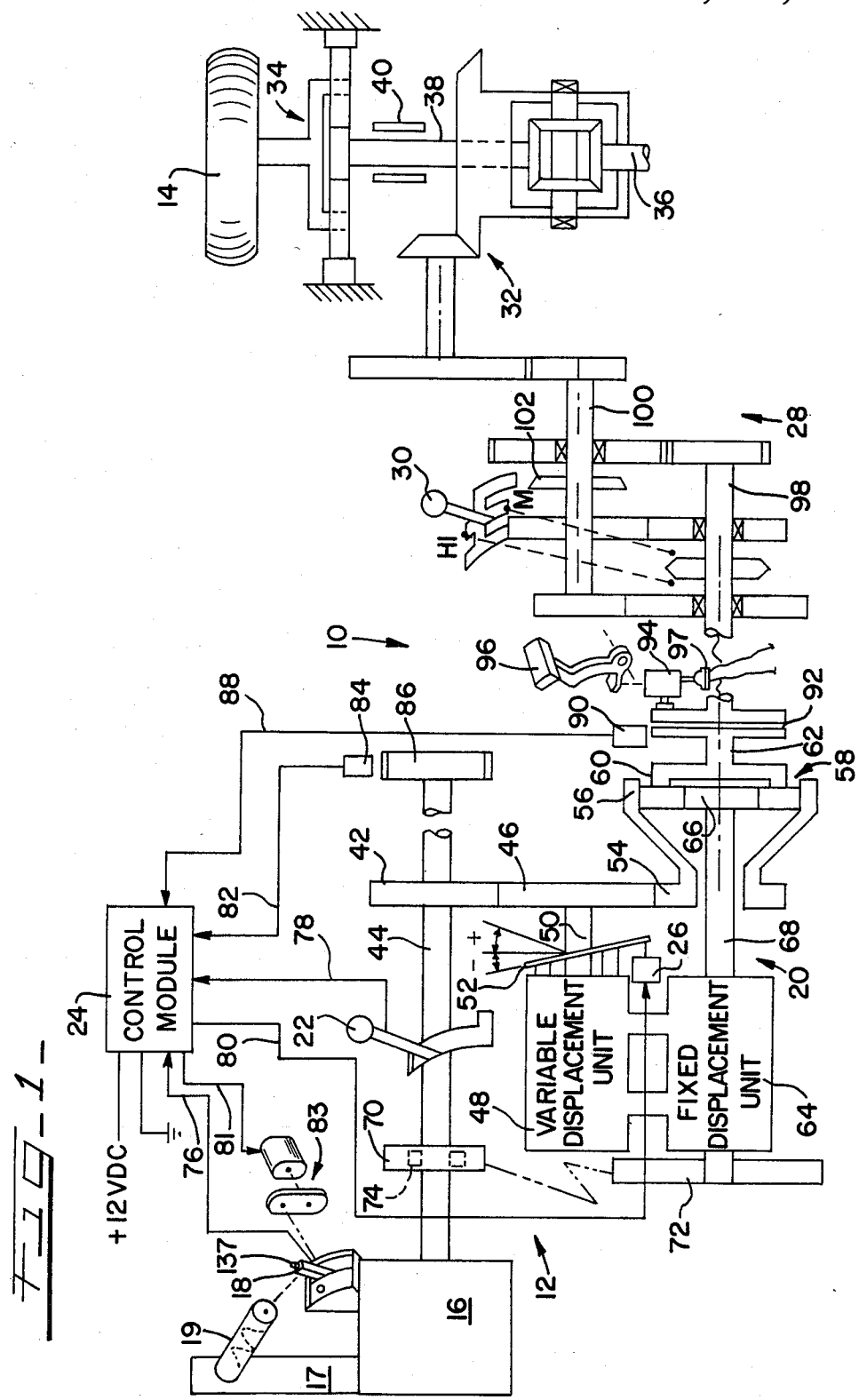
FIG. 1 is a schematic representation of a tractor power train as taken essentially in top plan view and embodying the automatic power lever and other controls in accordance with the invention.

More particularly, as shown in FIG. 1, the power train 10 of a farm tractor 12 supplies power for rimpull torque at the tractor drive wheel, of which the right rear wheel 14 is representative, through a path including an engine 16 controlled by a fuel injection pump 17 having a mechanical speed governor 19 of the well-known type manufactured by Robert Bosch Company under the designation "RSV" including a spring tensioned speed setting mechanism controlled through a linkage by a power lever 18 to change the governed speed setting by an appropriate change of spring tension. It will be appreciated that, in place of the mechanically controlled injection pump 17, an electronically controlled injection pump might be utilized wherein the fuel output of the injection pump, and thus the engine speed is varied in response to the signal 81 described hereinafter which in the preferred embodiment controls the automatic power lever 18.

There is further provided a hydromechanical speed transmission 20 controlled indirectly with a speed lever 22 and an electrical hydraulic actuator 26 by way of a control module 24. A three-speed, reversible range transmission 28 controlled by a gear shift lever 30, a reduction gear and differential drive 32, a planetary final drive 34 for each drive wheel, and rear drive axles identified at 36 at one side and at 38 at one side connected between the differential 32 and final drive at that side and controlled by a steering brake 40 complete the power train.

In the hydromechanical speed transmission 20, a drive gear 42 on the engine powered, transmission input shaft 44 continually meshes with a countershaft gear 46 which drives a swash-plate-controlled variable, axial piston hydrostatic pump 48 through an interconnecting countershaft 50. The actuator 26 tilts and holds a pump swash plate 52 so as to destroke it to zero pump displacement, and moves it therefrom through positive and negative angles for flow reversal by the pump at varying displacements.

The countershaft gear 46 also continuously meshes with a gear 54 connected to the right gear 56 of a three element planetary gearset 58 not only providing one of two inputs but also providing two different drive modes, regenerative and split. A planetary carrier 60 serves as the element driving the planetary output shaft 62.

A reversible fixed displacement axial piston motor 64 is mechanically connected to a planetary sun gear 66 by a sun gear shaft 68, and is hydraulically connected to the variable displacement pump 48 so as to be driven by the latter at varying speeds in opposite directions. But despite the sun gear 66 being rotatable in opposite directions, nevertheless the planetary ring gear 56, carrier 60, and planetary output shaft 62 always partake of rotation in the same direction as the transmission input shaft 44. With the swash plate angle full negative and a reverse moving sun gear 66, the effective hydromechanical gear reduction ratio provided at 58 is 1:2.39, and with the swash plate angle full positive and forward sun rotation (i.e., in engine direction), the gear reduction ratio effectively obtainable is 1:1.005.

A pinion 70 supported for rotation on and relative to the transmission input shaft 44 constantly meshes with a gear 72 secured to the same sun gear shaft 68 as the motor 64. The fixed ratio constraint thus imposed on pinion 70 causes it normally to rotate oppositely to the shaft 44, or to rotate in the same direction therewith but normally at a slower speed. Extremely strenuous transmission start up conditions and others can cause the pinion 70 to reach the same speed in the same direction as shaft 44, causing engagement of a one-way overspeed clutch 74 interposed between the pinion and shaft 44 so as to cause the pinion 70 to be a reaction member to sun 66 and motor 64; in that way, strenuous conditions can never make the motor 64 overspeed beyond the geared limits established by the reaction member, i.e., the pinion 70, and so the motor 64 cannot be damaged internally by excessive speed. For further details, reference can be made to the afore-mentioned U.S. Pat. No. 4,138,907.

A power lead 76 from the automatic power lever 18 enables the module 24 to monitor the power setting, and a speed lead 78 from the speed control lever 22 enables the module to monitor the transmission speed setting. The module 24 is powered by +12 V DC as illustrated and, by an ouput cable 80, automatically controls the electrical hydraulic actuator 26 for the swash plate.

By another interconnecting power output cable 81, the module 24 automatically controls a DC motor 83 which is shaft connected, at the pivot of the power lever 18, to rotate the latter into desired spring tension setting positions for the governor mechanism 19, thus resetting injection pump 17 and controlling the engine speed and the available engine power.

An engine speed lead afforded by a connection 82 from a transducer 84 enables the control module 24 to monitor, via one gear 86 indicated on the engine powered, transmission input shaft 44, the actual engine rpm at the input to the hydromechanical speed transmission 20, i.e., before gear reduction. A similar transducer 90 and transmission speed connection 88 enable the module 24 to monitor the drive side of a mid-mounted master clutch 92 for the transmission output rpm, i.e., after gear reduction. A valve controlled hydraulic actuator 94 causes internal multiple plates of the pressure-disengaged clutch 92 to disengage and to engage, respectively, under control of a tractor clutch pedal 96 when it correspondingly is depressed and released. Hydraulically connected to the actuator 94 is a normally open pressure switch 97 which, in response to an hydraulic pressure rise sufficient to disengage the clutch, closes its contacts. In other words, the driver closes the switch 97 by depressing the clutch pedal, and a closed circuit, not shown, signals that the clutch is decoupled. Switch 97 could also be a mechanical switch actuated by the clutch pedal, if desired.

The clutch 92 decouples to allow gearshifts in the range transmission 28 and can then recouple together the respective transmissions 20 and 28.

The range transmission 28 has respective sets of speed changing gears mounted on the input and output shafts 98 and 100, respectively. When the lever 30 is shifted into the position marked HI a synchronized jaw clutch sleeve shifts on shaft 98 for establishing high range, and a shift of the lever 30 into the position marked M causes an opposite synchronized jaw clutch shift on shaft 98 for mid-range setting in the transmission. The sleeve 102 of a LO synchronized jaw clutch on output shaft 100 is employed for low range and additional means are provided for reverse, not shown, for the range transmission 28.

Gear ratios are selected such that the range transmission 28 provides substantial overlap in its mid range M, so that the infinitely variable speeds otherwise available in the top of the LO range can be readily duplicated, without downshifting, while in the bottom of the mid range M. Similarly, the bottom of the HI range can be duplicated with infinite variability in the top of the mid range M, without need for upshifting while variations are made within such range of overlap.

For purposes of discussions following immediately hereinafter, the range transmission 28 will be presumed to be in its mid range M which in practice covers the infinitely variable speeds at which the present tractor, and agricultural tractors generally, are utilized approximately 90 percent of the time; those speeds are generally the ones used in actual field work.

In accordance with the principles of the reaction member control in hydromechanical transmissions, the effective gear reduction ratio of speed transmission 20 is established by control of the sun gear 66 in its speed and relative direction of rotation, under the accurate direction of the pump swash plate 52 according to its angle of tilt. Carefully controlled actuator means 26 is provided for the purpose.

ELECTRICAL HYDRAULIC ACTUATOR—FIG. 2

The swash plate 52 is mounted transversely within the case of the pump 48 so as to be centered in a span of bearings, a representative one of which is the tapered bearing 104 defining the plate tilt axis 106. The actuating means 26 comprises a double acting hydraulic cylinder 108 arranged with its housing guided in fixed motor slideways 110 and 112 and having a lug 114 projecting through a window, not shown, cast as a long longitudinal slot in the side of the pump casing. A stud 116 held in screw threads in the swash plate 52 has a ball end 118 projecting laterally into, and closely confined within, a complementary slot in the lug 114. Accordingly, as the cylinder housing moves longitudinally along the side of the pump case as guided along a piston shaft axis 120 for the cylinder, the pump swash plate 52 changes its tilt and then stops within the angular swing range indicated about its tilt axis 106.

Figure 2:
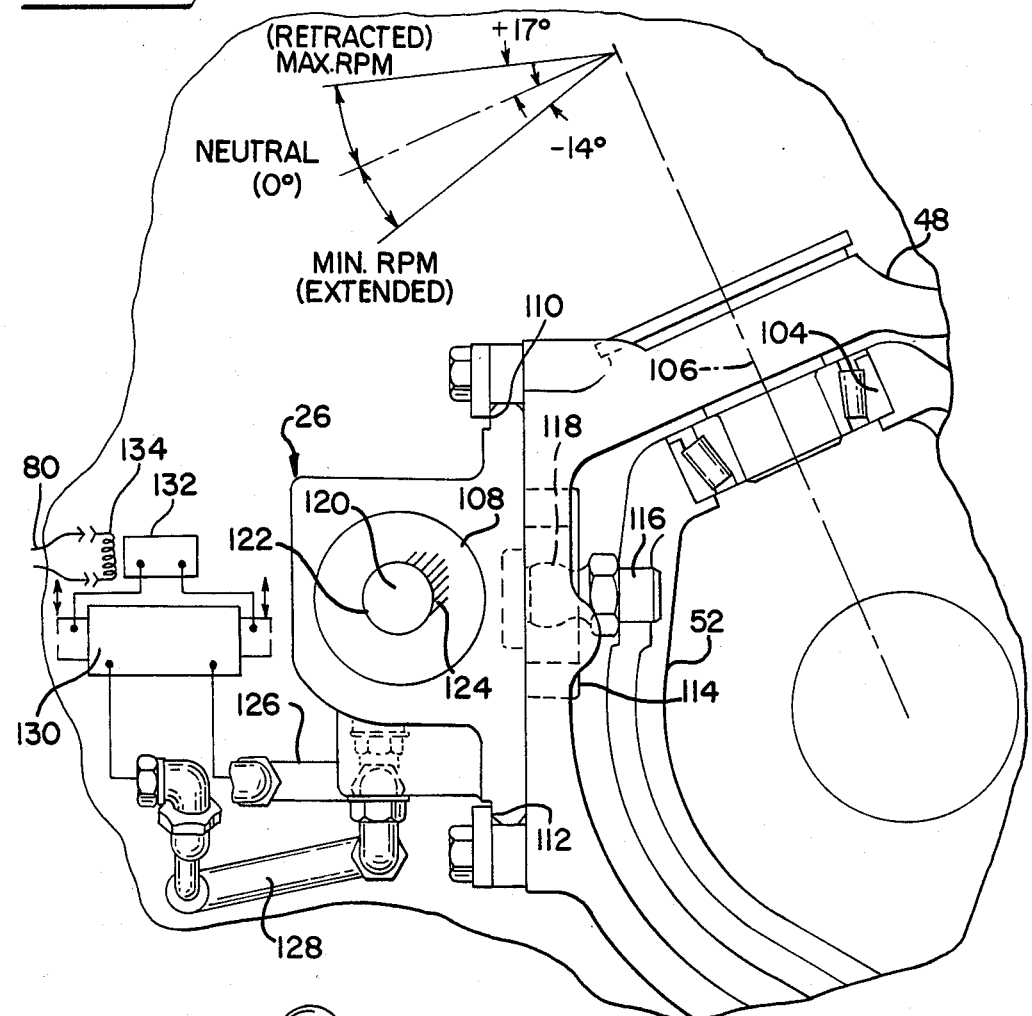
FIG. 2 is a partial, transverse-sectional view, partially schematic, showing the electrical hydraulic, variable displacement mechanism for changing the speed reduction ratio of the power train.

In one physically constructed embodiment of the invention, the piston shaft 122 defining the axis 120 of the double acting cylinder 108 projected through seals at opposite ends of the cylinder 108 and was fixed at anchor 124 at the proximal end as viewed in FIG. 2. Connections were such that as the distal hydraulic service line 126 was pressurized so as to introduce fluid to the far side of the fixed piston, not shown, the housing of the cylinder 108 within slideways 110,112 retracted therein relative to proximal anchor 124 so as to tilt the swash plate for positive angularity and higher speed with less gear reduction. Conversely, pressurization of the proximal service line 128 caused advance of the housing of cylinder 108 back toward the anchor to produce negative plate angularity and more gear reduction in the speed transmission, not shown.

A four-way, closed center piloted valve 130 hydraulically controls the cylinder 108, in response to an electrohydraulic proportional servo pilot valve 132 commercially available. The microprocessor output cable 80 through a proportional coil 134 automatically electrically controls the pilot valve 132, the pressure output of which is proportional to pulse width and direction of the signal electrically supplied through the cable 80.

Prior to instituting this automatic tilt angling operation the operator will set the range transmission, for example, in mid range M, and will also set the other controls for speed and power by close estimation according to his experience.

OPERATOR CONTROLS—FIG. 3

In this enlarged scale figure illustrating the operating console controls with greater particularity, all positions including park P for range shift lever 30 are shown, except for the unmarked neutral position N in which it is pivoted as actually illustrated. As shown in operative association with the lever 30, an out-of-neutral monitor microswitch 133 opens a circuit controlled thereby (not shown) and signals that the range transmission is out of neutral N. The microswitch 133 is provided to indicate a neutral N setting and, similarly but not shown, a means is also provided to electrically indicate park P. The microswitch 133 is cammed closed by the lever pivot shaft 135 when in neutral N and thus interrupts the out-of-neutral signal.

A manual out-in plunger switch 137 carried by the handle of the power lever 18 has a spring biased, switch-pen position when in its "out" position, as illustrated, corresponding to manual operation by the driver, adjustable at will solely by him. But when thumb-depressed into the handle into its detented "in" position, not shown, the manual switch 137 closes, switching the power lever 18 into automatic operation as disclosed hereinafter. In the broader aspects of the invention, if manual control of the engine speed in the field is not considered necessary, the power lever could be dispensed with and the engine power controlled directly by the module connected to an electrically controlled injection pump.

As seen aligned in the console housing 143 with its companion levers 22 and 30, the power lever 18 is the only one which may move automatically. Interposed in the latter's arcuate path of movement is a limit switch 139 supported for adjustment in the arcuate slot 141 in the console housing 143. The switch may be mechanically positioned by the operator between the lever 18 and its LO idle position, and is electrically connected to prevent the power lever from further decreasing the power setting during automatic operation once it engages the limit switch but does not otherwise interrupt automatic operation.

In the field, the operator sets the power lever 18 somewhere above the low idle position up to and including the wide open throttle position. The engine may be loaded or unloaded in the position set, depending upon tractor load requirements.

At the same time, the operator sets the transmission output speed lever 22 at a point between or including FAST and SLOW approximating the effective gear reduction expected to be required in the speed transmission while the range transmission remains in its aforementioned mid-setting. Then the clutch pedal, which in the meantime was depressed, is released and the tractor proceeds. The operator may then depress the push button switch and automatic operation of the power lever will commence as hereafter described.

Before entering into a description of the automatic modes of power lever operation and the specific design of the power lever 18 disclosed herein, it is first necessary to explain the automatic operation of the tractor transmission with manual control of the power lever. In its two automatic modes, the transmission ratio is adjusted automatically primarily to provide the lowest fuel consumption and secondarily to limit the transmission output speed and hence the ground speed to that desired speed set by the speed lever 22.

ENGINE RPM VS. LEVER POSITION—FIGS. 4A and 4B

These figures are a graph of actual engine speed plotted against engine power lever or throttle setting, all in revolutions per minute, the power lever setting representing the idle or no load speed for a given lever position. The particular engine is an International Harvester DTI-466B diesel engine. The power match curve 136 represents the desired engine speed at which the engine should run for each power lever setting. For example, point A is the desired engine speed, about 1800 rpm, for a power lever setting which would produce about 1950 rpm at no load.

The power match curve 136, which will be utilized by the microprocessor to control the drive train, although shown as a straight line can be configured as desired and tailored to provide the engine speed considered appropriate to the circumstances without regard to whether the desired engine speed represents a particularly optimum operating speed. However, the majority of the desired engine speeds of the power match curve preferably correspond to the speeds at which the drive train achieves its minimum specific fuel consumption. For simplicity herein, the minimum drive train fuel consumption will be considered to be the same as the engine minimum brake specific fuel consumption (BSFC) shown for example in FIGS. 7A and 7B but in the real world of transmission efficiencies, the power match curve could be tailored to suit the power train specific fuel consumption. Further, the power match curve could be tailored to terminate, for example at point S and follow the path 136' for reasons to be discussed hereinafter or to depart from the minimum specific fuel consumption and follow the torque curve to achieve maximum engine power as in FIG. 7A. The power match curve 136, when it does correspond to minimum BSFC, can theoretically never reach the no load condition curve 138 which shows higher speeds at all points because at no load BSFC is infinite.

Each power lever setting in the available range from LO idle to HI idle will have its own desired engine speed, thereby generating the power match curve 136. One example will typify the rest in the range.

EXAMPLE I

In this example, for an engine power lever setting in the MANUAL mode of 1950 rpm, the automatic tilt angling of the swash plate causes the engine to operate at operating point A indicated on curve 136 resulting in an actual engine speed of about 1800 rpm at a given load with the mechanical advantage afforded by the speed transmission.

That advantage, let us assume, occurs with an effective 1:1.5 gear reduction in the speed transmission. The control module 24 has two transmission control modes depending upon the condition encountered.

If the soil condition were, for example, to add more rimpull resistance to the tractor, a point B having an engine speed of, say 1700 rpm, might theoretically be reached for the 1950 rpm power lever setting. However, the control module 24 immediately senses the underspeed and begins its primary or power limiting mode of operation. The effective gear reduction ratio in the speed transmission is automatically changed for more reduction, for example to 1:1.7, obviously giving the engine more of a mechanical advantage so it can speed back up to the actual desired speed A, but naturally at the expense of slowing the tractor ground speed somewhat.

In other words, the temporary increase in load on the tractor would seem normally to demand reaction by the operator to advance his power lever setting and thus compensate with increased engine power output. But with automatic power limiting, the module automatically compensates without operator intervention and without the engine being lugged down in speed by the temporarily increased load.

When the rimpull resistance returns to the original value, the control module operates, in another phase of its power limiting logic mode, to sense the resulting tendency of the temporary actual gear reduction ratio to produce a higher engine speed than the calculated optimum represented at point A. To counteract this tendency to operate with too much effective gear reduction ratio and too high engine speed, the module automatically decreases the effective gear reduction ratio from 1:1.7 back to the initial lesser ratio of 1:1.5 appropriate to a higher tractor speed. That is, the engine is automatically afforded less of a mechanical advantage over the now-reduced load until the original condition is restored. It can handle a greater load at its power setting and is therefore loaded up to a greater amount, and the power match is restored right back to the desired engine speed. When the desired engine speed produces the lowest specific fuel consumption, it can be seen that extremely fuel efficient operation occurs by maintaining the engine at this speed.

A contrasting cycle, completed under a different node of operation of the module, is to be taken up in the example now to be considered.

EXAMPLE II

Figure 4:
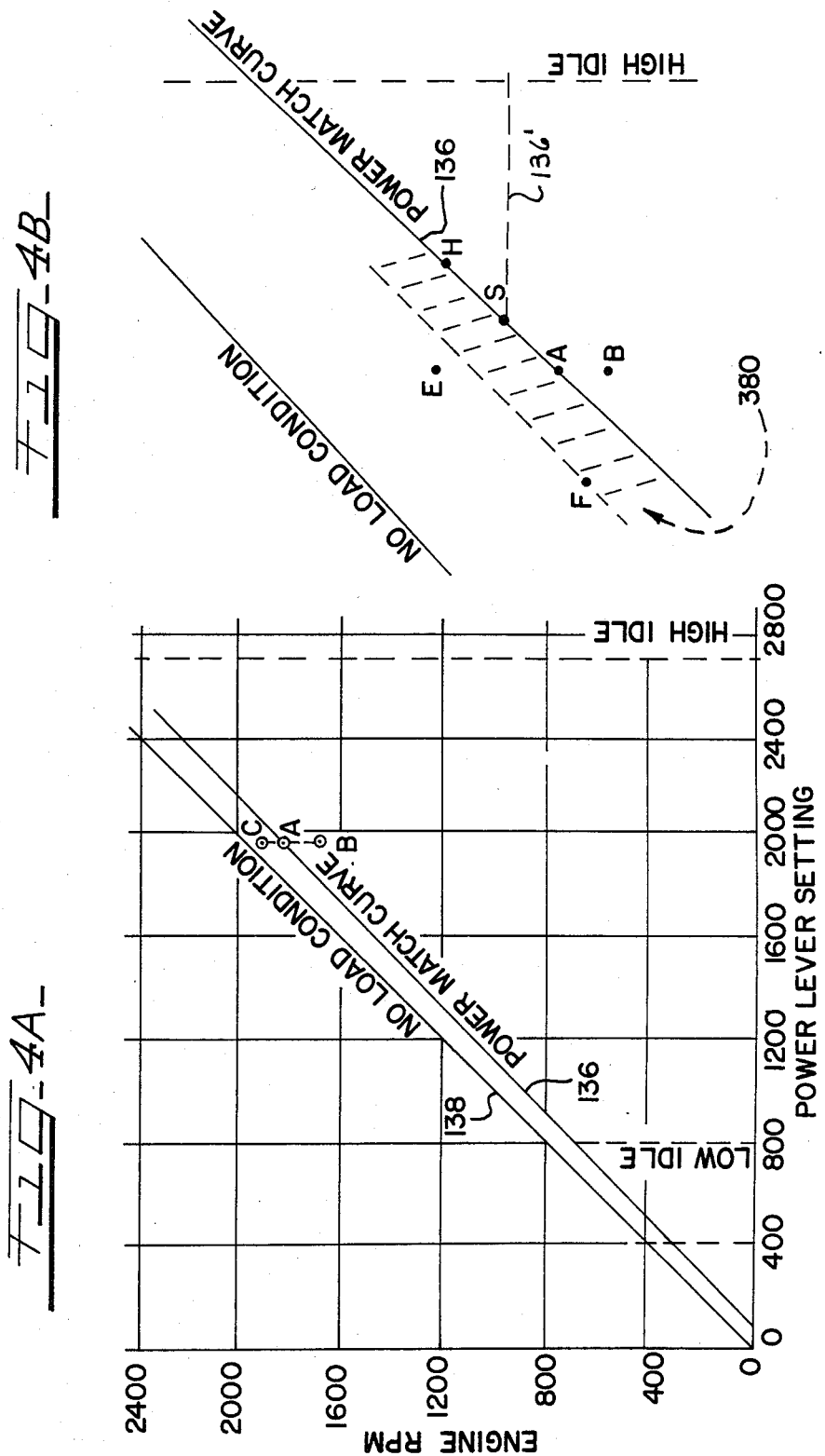
FIG. 4A is an actual speed-desired speed graph with the power match curve plotted thereon, and complementary FIG. 4B corresponds as an inset of the same graph, to enlarged scale to show additional, modifying data.

If, while operating at point A appearing in the graph shown in FIG. 4A, soil resistance stays the same but the tractor encounters a slight short downslope, as an example of a lightened load, the control module 24 enters into the second, or constant ground speed node of operation. It does so because of the actual change of the operating point to point C, say, 1900 rpm, again with a power lever setting of 1950 rpm and an effective transmission ratio of 1:1.5. Engine speed-up on such a short downslope tends to cause a finite increase of ground speed, and the speed transmission automatically causes more reduction ratio, e.g., 1:1.7, restoring the initial ground speed desired. The speed control logic mode perforce continues because, all the while, the primary power limiting logic mode has been satisfied, that is, both the engine speed and the output or ground speed are at or above their desired values.

So the tractor compensates by reducing ground speed back down to the original ground speed whereupon, to continue with this example, the tractor then makes the transition by bottoming out at the end of the short slope.

The cycle is completed because, at the end of the slope, the operating point A is resumed. That is, the engine speed drops because of the increased load and the module automatically adjusts the transmission setting for less gear reduction back to the originally assumed 1:1.5 ratio. Thus, from a former optimum setting condition A, the tractor without operator intervention immediately made adjustment to hold constant ground speed when on the downslope, and immediately readjusted to the former optimum setting condition to keep that same constant tractor speed when off the slope.

The control module carefully monitors the power train and has means provided for programming it for the operating modes appropriate to the conditions being monitored. An explanation follows.

MODULE—FIG. 5

At the center of the control module 24 as shown in this figure is a microprocessor computer 140 having its own memory and proper programming for the operating modes required.

Inputs include a power supply 142 for regulated 5 V input power, the magnetic transducer 84 adjacent gear 86 for engine speed rpm, the magnetic transducer 90 adjacent the clutch gear 92 for transmission output speed rpm, a +5 V potentiometer 144 for monitoring the setting of the power lever 18, and a speed potentiometer 146 for monitoring the transmission speed lever 22 for its setting.

The outputs include the proportioning coil 134 for the swash plate pilot valve 132 for controlling the speed transmission and the power output cable 81 to the governor motor 83 for re-setting the power lever 18 automatically when the operator has switched it for automatic operation as discussed above.

B+ power is impressed on the +5 V power supply 142 and, by a connection 148, is also impressed on a pulse width modulated swash plate drive circuit 150m. A ferrite anti-noise bead 152 is present in the B+ lead to the power supply 142 and a tantalum capacitor 154 having one plate grounded is also present thereat to reduce high frequency electromagnetic interference from entering into the power supply 142. Also present is a series-connected reverse-polarity-detecting diode 156 to insure against damage in case the power supply is connected with wrong polarity to the source of B+. An electrolytic capacitor 158 having one plate grounded filters the B+ power. Also, a varistor 160 grounded at one side will, if optionally provided, protect against noise transients occurring from the B+ source from time to time.

A resistor 162 leading from the B+ power line is series connected to ground by a Zener diode 164 having a capacitor 166 parallel connected therewith and together serving as shunt series regulator to regulate voltage of the power supply.

A resistor 168 impresses the Zener voltage on the base of an NPN transistor 170 which, through its collector, delivers to the B+ power line electrons that its emitter is pumping from a junction 172 out of the base of a second NPN transistor 174. The NPN transistor 174 conducts electrons from the +5 V linear voltage regulated terminal 176 through its emitter to the B+ power line through a collector connection to the latter, and incorporates a base bias resistor 178. Two series connected resistors 180 and 182 as supplemented by a paralleled capacitor 184 serve in conjunction with the transistors to define what the regulated linear output voltage will be at +5 V terminal 176.

The transmission speed cable 88 from the transducer 90 on speed transmission clutch output gear 92 transmits therein an essentially sinusoidal wave which first encounters in two stages of the circuit a pair of RC filters 184 and 186. The wave then encounters a pair of oppositely poled diode clippers 188 and 190 which clip off the waves so that they are flat on top and on bottom, limited to about 1½ V peak to peak. Further RC filtering at 192 is followed by directing the wave pulse as input to a schematically shown comparator 194. Full connections thereto are shown analogously by way of a counterpart comparator 196 grounded at 198 and receiving +5 V through a terminal connected through a capacitor 200 to ground. The comparator 196 is connected to engine speed transducer 84 in the same manner.

The regulated linear +5 voltage is supplied through a resistor 202 to the output junction 204 of comparator 194, whereas another similarly supplied resistor 206 is connected to the output junction 208 of the counterpart comparator 196.

The output at junction 204 is the square wave indicated and, similarly, the output at the comparator junction 208 is such a square wave. Those waves in one physically constructed embodiment of the invention ranged in frequency from 10 Hz to 7000 Hz and had digital form for ease in computing shaft rpm.

At the noted frequencies, the rpm signals of engine speed from 84 and transmission output speed from 90 are separately handled and analyzed by the microprocessor 40 by multiplexing, starting at their output junctions 204 and 208, respectively. A pair of diodes 210 and 212 bridging therefrom are joined in series cathode to cathode and their junction is connected to a junction 214.

A bias resistor 216 and base connector 218 from the junction 214 act in a way on an NPN transistor 220 so that, for example, the square wave pulses alone at 204 are ineffective to allow the transistor base to turn on transistor 220 through the diode 210. But the transistor 20 has a special inverter function when multiplexing due to its connection 222 of its collector to a pin 224 on the microprocessor 140 and also to the linear voltage regulator's +5 V through a resistor 226. Thus, according to multiplexing procedure, the microprocessor 140, in order to measure engine rpm, has a pin 228 go positive in readiness as to when the square wave causes junction 208 likewise to go positive. At that point of coincidence, the inverter transistor 220 by inversion causes the pin 224 to go low, starting a timing cycle within microprocessor 140. That cycle counts the interval until the next coincidence between the positive (high) pin 228 and the positive-going square wave at 208, which causes the pin 224 on microprocessor 140 to go low again so as to terminate the timing interval. The engine speed is at once determined by microprocessor 140, whereupon it causes another pin 230 connected to junction 204 to go positive so that the microprocessor 140 can similarly determine the transmission output speed from the tooth speed of the turning gear 92. The cycle repeats about sixty times per second in the microprocessor.

Figure 5:
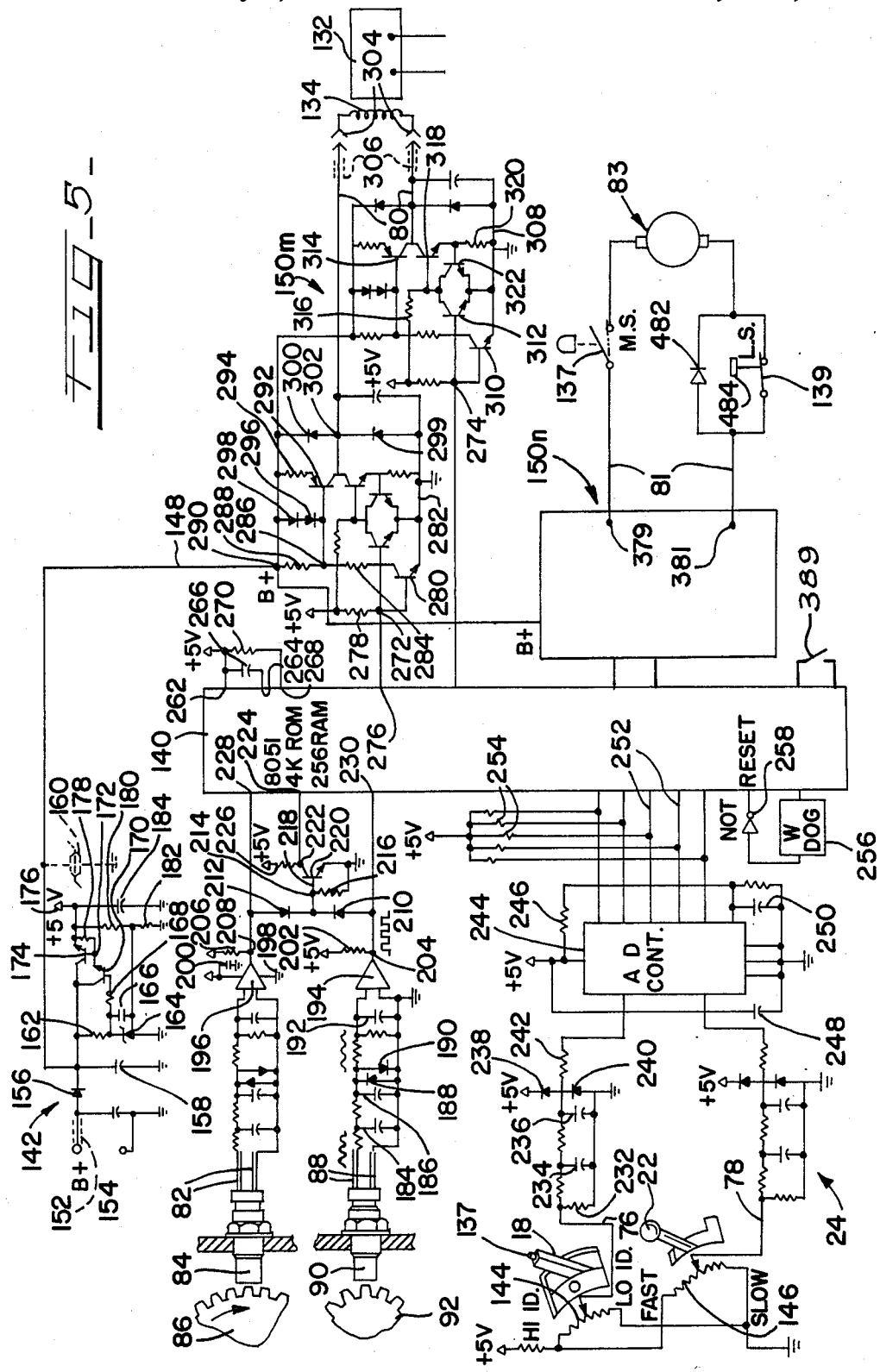
FIG. 5 schematically includes the control of FIG. 1, and further includes the operator's controls of FIG. 3 and part of the schematic portion of FIG. 2, all in an overall schematic control diagram.

The power lever 18 appearing in FIG. 5 has a mechanical linkage which has heretofore been described for making changes in the power setting of the engine through governor 19. With an electronically controlled fuel pump, such changes might be directly accomplished without a governor linkage. However, it is probable that a power control lever would still be present. Separately, the electrical connection 76 by means of the potentiometer 144 serves as the means of constantly monitoring the power lever position and hence the engine governor setting.

A pull down resistor 232, appropriately grounded, provides for fault protection to the potentiometer power lead 76, as in the case of a broken wire, for example. Two stages 234,236 of RC filtering are present in the power lead, and also present are a pair of series connected clamping diodes 238,240 poled as shown to protect the power lead against noise spikes; finally, a current limiting resistor 242 leading from the clamping diodes' midjunction delivers the monitored power lever voltage setting signal to an analog to digital converter 244. The analog to digital converter 244 is commercially available under the National Semiconductor designation ADC0833 and is found to perform satisfactorily. Linear voltage regulated to +5 V is supplied to the converter 244, suitably bypassed for noise and other protection purposes by a resistor 246, a filter capacitor 248, and an RC network 250. The converter 244 supplies input as a digital signal to the microprocessor 140 through the various pin leads 252 which are supplied through resistors 254 at +5 V by the linear voltage regulator.

The transmission speed lever 22 is digitally monitored in the same way by the converter 244, and also supplies its own digital command signal through the microprocessor 140 to proportioning coil 134 for direct control through pilot valve 132 of the swash plate tilt angle. There are no mechanical connections between the speed lever 22 and the pilot valve 132 similar to that of the power lever, only electronic control over the swash plate.

A watchdog circuit 256 operates through a comparator and a NOT gate 258 as a timer to restart the microprocessor 140 in regular way in case something goes wrong.

The microprocessor 140 receives through its input pin 262 the necessary power to run it from the +5 V linear voltage regulator. An adjacent pin 264 is connected to the regulator by a decoupling capacitor 266 for blocking power source noise. Another adjacent pin 268 is connected by a resistor 270 to the +5 V linear voltage regulator for biasing the microprocessor 140 constantly to use its aforementioned internal memory. The required input crystal, a CPS Knight, which is connnected in standard way is omitted from the showing of the microprocessor 140 in FIG. 5.

The transistors employed in the pulse width modulated swash plate drive circuit 150m of FIG. 5 are all of the NPN type except 292 and 314 which are of the PNP type. Of the two service connection junctions 272 and 274 of that circuit, the junction 272 has among others, a connection to an output pin 276 on microprocessor 140, a connection through pull-up resistor 278 to the +5 V linear voltage regulator, and a connection to the base electrode of a transistor 280. The transistor emitter is connected to a ground line 282 and the collector is connected through a resistor 284, a junction 286, and a resistor 288, to a B+ junction 290 supplied by connection 148.

The second transistor 292 (PNP), the base electrode of which is connected to junction 286, has the emitter connected through a resistor 294 to the B+ junction 290 and has the base connected through the respective cathode-anode of a diode 296 and the respective cathodeanode of a series connected diode 298 to the B+ junction 290; the elements 294, 296, and 298 provide current limiting protection to the second transistor 292. A pair of series connected clamping diodes 299 and 300 provide a cathode to anode and another cathode to anode connection down from the B+ junction 290 to ground line 282; they protect against noise spikes and have an intervening junction 302 connected to the collector electrode of the second transistor 292.

In operation, microprocessor 140 causes pin 276 to go high at the same time that it causes junction 274 to go low. The pull-up resistor 278 goes to the same +5 V potential at its opposite ends and the correspondingly high junction 272 positively biases the base of transistor 280 so that it conducts. Accordingly, the resistor 284 goes less positive at its end connected to junction 286 and causes the base of the PNP second transistor 292 to bias the latter into conducting. So a positive rectangular wave pulse, of modulated width determined by the microprocessor 140, is transmitted from the intervening junction 302 so as to be passed by the output cable 80 through the proportional coil 134 of the pilot valve 132. Suitable cable connectors are indicated in the cable at 304 and suitable anti-noise ferrite beads are indicated therein at 306.

The circuit from coil 134 is completed to ground line 308 in the rest of the circuit in which, because service connection junction 274 is momentarily low, the circuit's respective transistors 310,312 (NPN) and 314 (PNP) are base biased respectively negatively and positively so as not to conduct. A pull-up resistor 316 is connected between the +5 V linear voltage regulator and the base of a transistor 318 and, unimpeded, gives positive base bias to the transistor 318 causing it to conduct and discharge the positive rectangular wave through a resistor 320 thus completing the circuit to ground line 308. The transistor 318 is protected in the usual way by the resistor 320 in conjunction with another transistor 322 which together form a current limiter on the transistor 318.

The positive rectangular wave ceases when the pin 276 allows the service connection junctions 272 and 274 to reach the same potential levels. The next pulse starts after a predetermined interval, and so forth for the successive pulses in the positive direction as long as continued by the microprocessor.

Negative pulses, in succession, are started with successive operation by the microprocessor 140 causing junction 274 to go high at the same time as junction 272 goes low.

The cycles are repeated in either direction and, with pulse width modulation as determined by the microprocessor, the proportional coil 134 receives an average positive current or negative current or no current as a proportional thing, causing proportional fluid directing action by the servo valve 132 acting as pilot valve.

The purpose of the swash plate drive is to provide amplified electrical hydraulic actuation with precise control. The high-low microprocessor output means that the pin such as pin 276 is impressed with +5 V or 0V at extremely low current carrying capacity. The B+ voltage impressed on the drive circuit 150m can fluctuate on the tractor at anywhere from 9 to 16 V whereas, despite the current amplification provided by the transistors, the proportional coil 134 is rated at only 7.5 V which is the most voltage ever impressed upon the coil terminals by the electrically amplifying transistors. Hydraulic amplification in the pilot valve 132 as shown in FIG. 2 greatly increases the force possible because of responsiveness of the piloted valve 130 which readily handles the moving and stopping load under which the swash plate is forced to operate.

The control module 24 as shown in FIG. 5 is not confined to any set number of steps or inflexible sequence or order for its operation, although one flow chart for ease of understanding will be given, simply by way of example and not limitation.

LOGIC FLOW CHART—FIG. 6A

The starting point for the control module's automatic operation is the proportional control voltage picked off the potentiometer 146, varying with transmission speed control lever 22 as it positions the slider illustrated, and applied as monitored, according to block 324, is the desired transmission output speed command. The next block 326 of the FIG. 6A flow chart indicates the monitoring of actual engine speed before gear reduction, depending at outset of the automatic operation strictly upon the operator's positional setting of the power lever and existing load on the tractor at the time. The converter block 328 next following represents an operation within the microprocessor of constantly recalculating a control parameter, the commanded speed reduction ratio of the speed transmission, determined as the quotient of desired speed from block 324 divided by actual speed from block 326. A further crucial block 330 represents constant monitoring of the power lever setting as initially set by the operator at his desire for the general operation he seeks.

The calculation block 332 next following in the sequence represents use of the power lever setting as parameter for the recalculations, updated sixty times per second, of the desired engine speed based on the power match curve 136 in this case providing the least brake specific fuel consumption for that particular setting of the power lever.

Next, diamond 334 represents the microprocessor's digital signal comparison of actual engine speed to the desired engine speed as scaled numbers. If the actual engine speed by comparison is equal, there will be no change at point of the diamonds 334 or 335 or in the desired speed command ratio being transmitted to block 336. However, if the actual engine speed drops below the desired engine speed, a Yes is generated which turns on modify block 338. Specifically, the microprocessor is programmed automatically to modify the command ratio signal so as to call for more gear reduction, increasing the mechanical advantage and thereupon restoring actual engine speed to equivalence with the desired engine speed as then calculated by the microprocessor.

To reach its signal modification step (338), the microprocessor 140 is programmed to detect some predetermined value of underspeed error reached at the preceding logic stage of simple digital comparison (334), before operating swash drive circuit 150m to produce the unmodulated or maximum width, DC rectangular wave pulses. Lesser or zero errors sensed by microprocessor 140 result in modulated drive wave pulses of digitally proportionally lesser or zero width, respectively.

So the main speed command signal, modified or unmodified as appropriate, is transmitted (in ratio form as the command speed divided by sensed actual speed) on to the monitor block 336 which monitors and computes the actual ratio. Unimpeded, that command ratio as a digital signal will be transmitted through monitor block 336, to compare block 340, and thereupon utilized, if necessary, by blocks 350 and 352 or 360 to move the swash plate to bring the actual transmission reduction ratio (After Gear Reduction/Before Gear Reduction) and the command ratio (Desired Output Speed/Actual Engine Speed) into equivalence.

So now the engine speed has been brought back to the desired speed and so, a "No" exists at diamond 334. However, because the command ratio is now less than the desired command ratio, i.e., the ratio based on the desired ground speed set by the speed lever 22, the system remains in power limiting logic mode. A "No" answer also results from compare diamond 335 and so stable operation results, again with fuel efficiency.

When the additional load is now reduced, the engine will have a tendency to speed up. So now a "Yes" answer will result in compare diamond 335 which leads to compare diamond 337 which asks if the commanded ratio is still modified, i.e., is it less than the desired command ratio. A "Yes" result here leads to modify block 339 which modifies the command ratio for less reduction to bring it closer to the desired command ratio. When it reaches equivalence with the desired command ratio, a "No" answer will result from diamond 337 and the microprocessor will shift into speed mode if the engine speed is still higher than the desired engine speed. Until that equivalence is satisfied, the microprocessor will be operating exclusively in its programmed power logic mode although, in the meantime, the suppressed, second speed logic mode earlier mentioned will be continually operating entirely subordinate to, and over-controlled by, the dominant-priority power logic mode.

A means can be and preferably is provided in the power limiting logic to achieve yet finer control while satisfying the logic paths discussed above. This is by use of an integrator circuit to detect the engine speed changes indicated by compare diamonds 334 and 335.

Thus, the integrator accumulates the difference between the actual engine speed and the desired engine speed from diamond 334 each time the microprocessor runs through its logic and creates a larger and larger negative error, and thus more and more modification by modify block 338 until the actual speed equals the desired speed and no further error is accumulated. When the compare diamond 335 is activated by the engine speed exceeding the desired speed and thus produces a positive error, this also is accumulated but reduces the negative error, and thus the command ratio modification, until the error becomes zero. As before, further positive error results in the microprocessor entering the speed mode.

So in properly subdued tone, the monitor blocks 330 and 332 for the power logic as indicated continually monitors the desired engine speed and, as represented by compare diamonds 334 and 335, the comparison is continually being made to sense when the power logic mode modified signal to the transmission has brought the actual engine speed back up to the desired engine speed (satisfying the power match curve) and the command ratio up to the desired command ratio (satisfying the speed lever 22). When that point is sensed, and when the desired engine speed is exceeded with the power logic mode remaining satisfied, the microprocessor goes into its speed logic mode, bypassing blocks 338 and 339.

Because the actual transmission output speed and actual engine speed are constantly known, the block 336 representing constant monitoring of the actual speed reduction ratio functions in the same way as block 328 for the command ratio. Therefore, the actual speed reduction ratio from block 336 and the command speed reduction ratio from block 328, when compared at the step represented by diamond 340, will in the ideal case find equivalence of digital signal when the main command signal is modified just right. So the cycle will be repeated rapidly again, and again, just as soon as the repeat paths 342 and 344, the exit path 346, and thence path 348 leading through the microprocessor make their first completion.

In case the engine would speed up beyond its desired speed, as in the tractor encountering a downslope, the speed logic mode reacts through the blocks 326, 328, 336, compare diamond 340, diamond 350, and modify block 352 to cause more gear reduction; in other words, the engine speed-up, causing point C (FIG. 4A) to be reached, decreases the command ratio by raising the denominator, engine speed, so that by comparison the actual reduction ratio by staying the same becomes the greater ratio of the two, relatively speaking.

Therefore, as caused by the slight downslope of Example II, the greater effective gear reduction required in block 352 is achieved by appropriately modifying the actual ratio at that point and the thus modified actual ratio signal is transmitted as the new output in path 354,356 thus changing the proportional coil 134 and swash-plate tilt angle into some less positive angular direction to increase the reduction to account for the higher engine speed. So the constant ground speed is sustained as desired on the slight downslope. If the engine speed decreases, as when the tractor levels out, the command ratio will then exceed the actual ratio and the signal will go from compare diamond 350 to modify block 360 which will modify the ratio to less reduction. To maintain the constant ground speed, this operation continues until the engine speed comes down to the desired speed.

MIN. BSFC CURVE—FIG. 7A

The wide open throttle torque curve indicated at 362 in this figure is representative of automotive diesel engines in general use, such as an International Harvester DTI-466B engine. The points JKL indicated on the curve bear noting.

Without the power limiting logic mode, upon increased torque requirements on the tractor, the engine speed would drop off gradually until the engine approached its peak torque point J.

The general idea of the power limiting mode taught herein is to keep down-shifting a variable transmission as it loads up to stay on the power match curve corresponding to the minimum specific fuel consumption of the power train as well as for readjusting the power lever when needed so that the engine will actually positively follow all points defined by a least BSFC curve. The result is reduced fuel consumption. For example, the essentially straight portion of torque curve 362 defined at rated power by points K and L will be seen closely to parallel the constant 180 HP (135 kW) broken line and the constant 200 HP broken line appearing in FIG. 7A. But operating at full-throttle as indicated at point K (approximately 190 HP) would consume excess fuel, according to the graph.

What is significant and more desirable, is operating the same way but automatically at point L which in some instances will be accomplished at a 5 percent fuel saving, nevertheless developing about the same 190 HP. That fuel saving has been observed in one or more tractors embodying the present invention.

Superimposed on the graph of FIG. 7A are the diagonally upwardly and leftwardly extending straight governor curves, starting from the bottom for instance as 1000 engine rpm, 1500 engine rpm, 2000 rpm, etc., corresponding to different settings of the power lever 18.

Also superimposed are the known, seemingly concentric constant brake specific fuel consumption curves, rather much centering in regular way about the 0.35 curve indicative of 0.35 pounds (0.16 kg) of fuel consumed by the engine per horsepower hour. Radially outwardly therefrom appear the surrounding curves marked for respectively 0.36 pounds, 0.37 pounds, 0.38 pounds, 0.40 pounds, 0.42 pounds, and 0.45 pounds (0.20 kg) per horsepower hour.

Returning to the constant horsepower lines (broken), we can perceive that the 60 horsepower line is closest to the 0.38 pound curve at only one point, the 80 horsepower line is closest to the 0.37 pound curve at only one point, and so forth. That resulting pattern of points establishes the locus of points for a smooth broken line curve 364 joining all such points and being adjacent at the upper right end to the 0.35 pound curve, the lowest fuel consumption shown. It follows that such curve 364 is truly representative of near-minimum brake specific fuel consumption for the engine throughout the entire range of horsepowers enveloped by the wide open throttle torque curve 362 for the engine.

FIG. 7B represents a different engine than that presented in FIG. 7A and is starkly presented to illustrate a so-called constant horsepower engine having a torque curve 381' including rated horsepower point R and a peak torque point T, at which engine operation is undesired. A minimum BSFC curve 383 intersects the torque curve at point S. Of utmost significance, point S and R demark a segment 385 which is generally parallel to the parallel curves identifying, by their individual notation CT. HP, the constant horsepower family and itself representative of substantially constant maximum horsepower output which holds throughout, and despite, engine speed variations. That is, in the segment 385, the engine torque and speed vary inversely to one another, a decrease of either one of which is attended by a proportional, exactly offsetting increase of the other. As will be seen below, this characteristic proves to be useful from a fuel economy standpoint.

The minimum BSFC curves of FIGS. 7A and 7B readily correspond to the conveniently smooth power match curve 136 based thereon and which therefore represents a predetermined consecutive series of desired engine speed values productive of substantially minimum brake specific fuel consumption for the range of engine power settings. The power match curve 136, not the BSFC data, might then be stored in the microprocessor memory as a rough table, if the memory is somewhat restrictive, or with extensive memory capability digitally stored with only incremental differences in the speed values not requiring interpolation. However, in the present microprocessor 140, the relatively linear power match curve 136 is expressed as a simple engine speed equation and enables the microprocessor constantly to resolve the equation for solutions in precise digital terms for each and every setting to which the power lever 18 is adjusted. So the desired engine speed becomes a function of the power lever setting in the equation, the setting constituting the variable control parameter of which the changing values are constantly being entered in the equation by the computer for recalculation of same.

The wide open throttle curve of the torque of a combined engine-transmission train having infinite variability actually consists of an infinite number of curves constituting a family which keeps peaking more and more with more speed reduction in the infinitely variable transmission; the reason is the torque capability at the output shaft naturally becomes higher and higher with succeeding increases in transmission gear reduction ratio.

POWER TRAIN CURVES—FIG. 8A

In the graph of this figure with transmission output torque plotted against transmission output speed, only three curves appear of the wide open throttle torque for the overall engine-transmission combination.

At the transmission's least speed reduction ratio which is essentially 1:1, the torque curve 366 therefor closely approximates the torque curve of the engine alone and would be identical thereto if the transmission ratio happened to be exactly 1:1. The least BSFC broken line curve 368, which is also the power match curve, is readily superimposed as in FIG. 7A and corresponds only to curve 366. The overall torque curve 370 is shown for a transmission reduction ratio of 1:1.5. The broken line least BSFC curve 372 is readily superimposed appropriate only to the curve 370 and that transmission reduction ratio.

Finally, for visual comparison at the other extreme, the overall train torque curve 374 represents the condition of the transmission providing maximum gear reduction of 1:2.39 for greatly multiplying torque and rimpull. The appropriate least BSFC curve is plotted in broken lines at 376. A pattern of points WXY emerges establishing the locus of least fuel consumption points connected by a smooth average curve 378 for the entire reduction range of the present speed transmission.

As viewed in FIG. 8A, the diagonally upwardly and leftwardly directed straight broken lines represent the engine governor limited portion of the individual overall drive train torque curves of the engine-transmission train. As will be seen, during automatic operation, the transmission output speed or ground speed does not follow that portion of the torque curve (although the engine does).

It can be seen that from the zero torque point U on the transmission output-speed axis that an increase of torque straight up to point X on the reduction range curve 378 will result in minimum brake specific fuel consumption at that point for the transmission setting of 1:1.5 speed reduction. If increased ground resistance to wheel speed causes the control module hereof automatically to provide more gear reduction in the speed transmission, the transmission can readily accommodate as the operating point viewed graphically rises up the curve 378 toward Y thereon while maintaining minimum specific fuel consumption.

The starting point W for the overall train torque curve WXY can be considered typical and represents specifically the assumed initial condition of a steady load, a speed lever setting fixed for transmission output speed of 1650 rpm and a power lever setting fixed for 2000 rpm so that the engine under automatic operation is being run at the desired speed from the power match curve at corresponding minimum BSFC of approximately 1650 rpm, which is the same as the output speed because point W is on the curve 368 corresponding to a 1:1 ratio. To hold to the latter engine speed, despite increases in the load, is to hold to near-minimum specific fuel consumption. Because power match curve 368 has an infinite number of points W thereon available as starting points, depending on the power lever setting, the family of overall drive train torque curves akin to WXY is of infinite number and not attempted to be illustrated.

EXAMPLE III

An extreme example now given brings out the full adjustment capability of the present automatic power matching train operation. Speed logic is a straightforward way of establishing the stabilized initial condition, point W, just set forth. So in speed logic mode and despite governor droop, and from a transmission ratio of roughly 1:1.2 at point V on the FIG. 8A graph, the constant ground speed or second mode of operation will continue to change the transmission ratio to attempt to maintain a constant transmission output speed as the clutch 92 is engaged and torque increases up toward operating point W as rimpull load is increased. Meanwhile, the engine speed is being slowed by the load to the above-assumed 1650 rpm. Thereafter, the power limiting logic mode goes into effect automatically as result of the tractor's reaching its load and a very slight undershoot of the 1650 rpm point and maintains the tractor operating at W as desired on the WXY curve 378.

Specifically on the reduction range curve 378 for the speed transmission, already producing minimum BSFC in the engine, the transmission upon encountering increased resistance is caused automatically to introduce more gear reduction and, at reaching of the operating point X, the transmission will again have the engine operating with minimum BSFC still at 1650 rpm, but at an adjusted transmission ratio of 1:1.5. Further resistance increase of the tractor load shifts the operating point to approach Y, progressing thereto smoothly and always along the reduction range curve 378. And the full multiplication of torque, with a torque rise by 2.39 times, occurs with the reaching of point Y.

The significance is that, while on the WXY portion, the engine does not lug; it operates always and only on points on the curve WXY at the least BSFC speed, 1650 rpm, and entirely automatically with the same manual power setting and with no change from or intervention by the operator. The return pattern, on the same curve W,X,Y and equally efficiently, begins as soon as the extreme of 2.39 torque multiplication is no longer required for sufficient rimpull of the tractor.

The striking part of this mode of automatic operation is that the operator never detects the engine laboring even though tractor speed naturally slows during a stretch of highly burdensome soil resistance because the engine speed and torque output do not change significantly. It will be appreciated that in the contrasting constant ground speed mode, as from point V to W, the engine speed and torque output do vary.

EXAMPLE IV

There is a relationship between the modify block 360 of flow diagram FIG. 6A and the transition indicated by arrows from point V straight up to point W in FIG. 8A. The control module operates in the second constant ground speed mode beginning at point V where it compares the actual ratio with the command ratio and finds that, under increasing torque loading and as the engine slows down, the actual ratio is the lesser. So less actual gear reduction is required than the existing 1:1.2 ratio and the transmission moves toward establishing a 1:1 gear reduction ratio at the time the operating point W is reached while maintaining constant speed. Therefore, the so-called governor droop illustrated by the natural, broken line, diagonal governor curves is avoided in the power train output.

EXAMPLE V

The transmission in its secondary speed mode also desirably operates in the opposite direction, and automatically does so according to modify block 352 in flow chart FIG. 6A, in going through the opposite transition from point W straight down at constant speed toward the aligned zero torque point V, FIG. 8A. The circumstance is the gradual removal of appreciable torque-loading on the transmission and a thus increased engine speed so that the actual ratio sensed is greater than the command ratio and is readily determined according to the notation between compare diamond 350 and modify block 352, FIG. 6A. So, counter to the direction of the arrows, and with constant ground speed maintained between W and V, FIG. 8A, the automatic operation changes the transmission from 1:1 at W to a 1:1.2 at V for more gear reduction to counteract the natural loss-of-load speed-up of the engine; the slowing-down transmission and unloaded engine speed-up will offset one another, with constant ground speed maintained all during the transition.

By flow chart, FIG. 6A, the step represented by block 352 is to modify the actual ratio starting at that point W and the thus modified actual ratio signal is transmitted as new output in paths 354 and 356, thus changing the proPortioning coil 134 and swash plate tilt angle into some less positive angular direction for more effective gear reduction.

EXAMPLE VI

This example is merely cumulative to Example II preceding, but importantly illustrates what can be carried to an extreme situation very possibly encountered. Let it be assumed that the present tractor is proceeding easily on a slight slope with a heavy wagon lightly in tow, with the power train automatically operating with practically no reduction, let us say a ratio of 1:1 for simplicity. The tractor and tow immediately encounter an extended severe downhill condition so as to operate at some unmarked point vertically over point C, FIG. 4A, a motoring point above no load curve 138, that is, the wagon is pushing the tractor. The power mode is fully satisfied because the control sensors of the microprocessor serve only to assure it, while in that mode, that the actual engine speed is kept up to desired speed or, in graphical terms, that speed remains on or above the power match curve 136 in FIG. 4A and the command ratio is equal to or greater than the desired command ratio.

In this assumed situation, the actual ratio becomes the larger than the command ratio and gives rise to a signal which can be represented by the reaction of block 352 as required in the FIG. 6A flow chart. Consequently, as the rolling wagon tends to force the tractor downhill faster, a modified actual ratio signal from block 352 is transmitted in paths 354,356 to cause the swash plate to establish more and more effective gear reduction up to approximately a 1:2 or perhaps a 1:2.39 ratio. The engine is thus being motored to increasing speeds through the transmission by the wagon and tractor due to their downhill coast. So the full braking torque capability of the drive train is brought to bear automatically in the speed mode to ensure positive vehicle control.

By way of departure from the earlier presumption of the range transmission always being in the medium or mid range M, it remains entirely in the operator's province to upshift and downshift at will (FIG. 3), as when the speed transmission is approaching full positive angularity in its speed overlap with the HI range or full negative angularity in overlapping the LO range (FIG. 2). So when the load becomes such that the speed transmission's range can no longer automatically accommodate the tractor's operation the way is always open for the operator readily to restore the speed transmission to within its effective speed ratio range by shifting into HI for the lesser rimpull loadings or into LO for any excessive loadings.

Or an easier way is open, for effecting rather substantial changes, through power lever adjustment which can readily be brought about automatically to restore the near-minimum specific fuel consumption and constant ground speed operation desired.

AUTOMATIC POWER LEVER OPERATION

FIG. 4B enlarges a portion of the FIG. 4A graph of actual engine speed plotted against engine power lever or throttle setting. On the power match curve 136, the illustrative point A represents the power match point at which a power lever setting of 1950 rpm produces an engine speed of about 1800 rpm if sufficiently loaded to be in the power limiting mode. This steady match between load power required and engine power delivery at minimum BSFC is ideally desired and would hold, except that some operational variable will inevitably change.

EXAMPLE VII

If, while the power train graphed is operating at matched power point A, a significant decrease in soil resistance or a moderate downslope or both are encountered, the control module 24 is capable of entering into an operating mode reducing the setting of the power lever 18. This occurs automatically when the speed of the more lightly loaded engine increases toward the no load condition curve 138 toward point E, which is entirely outside, on the high speed side, of a power lever deadband 380 graphically appearing as a cross-hatched envelope above, and parallel with, the power match curve 136. The so-called width of the deadband is illustratively shown as amounting to about +50 rpm above all corresponding points on the power match curve 136. The deadband does not extend below the curve 136.

More particularly, as the sensed engine speed increases above the deadband 380 for the power lever, and at the same time that the speed mode is adjusting the transmission ratio to maintain constant tractor ground speed, the control module 24 also begins to cause a power lever setting reduction which continues until the engine reaches that reduced setting where the load is precisely sufficient to bring engine speed directly down into intersection with the deadband 380 as indicated at the desired point F.

At or just below this new operating point F, the module 24 continues in its regular speed mode of operation to keep the transmission adjusted for the new power setting, to maintain constant tractor ground speed at the desired speed as long as the engine speed is no lower than its point of intersection with the closely adjacent power match curve 136. The control module 24 is rendered more sensitive in its speed mode because of this extra fine tuning while automatically adjusting the transmission ratio in incremental amounts within the range graphed. It should be noted that the point E can only be reached transiently and is not a steady state operating point.

EXAMPLE VIII

In this contrasting example, and from operating point A at the outset, let us assume the plowing resistance of the soil increases which would cause engine speed to drop transiently toward point B, below the power match curve 136. The control module 24, in its power limiting mode described above, immediately begins to change the transmission ratio for more reduction to raise the engine speed to its desired speed point A, which effectively reduces the transmission output speed or ground speed. The control module 24 further senses the change in transmission ratio beyond a deadband 381 (FIG. 8B) and causes a power setting advance.

When the power lever setting is advanced, the engine accelerates and the engine speed exceeds the power match curve 136 shifting the command module into the speed mode which increases the transmission reduction to account for the increased engine speed. Within the deadband envelope 381, the desired transmission output or ground speed becomes equal to the actual output or ground speed and so a new steady state operating point H is reached at the left side of the deadband 381 shown in FIG. 8B with the engine operating at a new desired speed point H on the power match curve FIG. 4B.

If, from this stable operating point, the load decreases slightly, the control module 24 will shift into power limiting mode and cause the drive train to first cross the deadband to the desired speed line VW in FIG. 8B and then shift into the speed mode as described above. When the power lever 18 is operating in the automatic mode, the drive train will not follow the curve WXY of FIG. 8A beyond the width of the deadband. Rather, it will adjust for increased loads by increasing the power lever setting until it reaches the maximum setting at point Z' at which point, the drive train will follow, as indicated by the arrows in FIG. 8B, the curve 374 or Z'Y' upon further increases in load while the engine operating point stays constant. Once beyond the point Z', a decrease in load will cause the drive train to follow the path Y'ZWV with the power lever setting automatically adjusting down as the engine speed increases above the deadband 380 of FIG. 4B as explained in the preceding example.

Again, incremental adjustments will be fine tuned into the power train through appropriate incremental transmission ratio changes by the module, which is more sensitive in its power limiting and speed modes compared to when it causes power setting changes.

Because it constantly monitors actual engine speed and constantly monitors the nominal power setting, the control module 24 can not only program the power setting in accordance with the power match curve resulting in minimum BSFC but also is provided with power means for automatically changing the power lever position at least part way toward such a setting.

EXAMPLE IX

The engine of FIG. 7B is performing in normal way under the operating condition represented thereon at Q, the point of intersection between the near minimum brake specific fuel consumption curve and the governor droop curve extending diagonally to an idle speed of 2000 rpm. If the soil resistance causes the required engine torque to increase to 550 lb.-ft. as at point S, then the automatic power level control and to some extent, the transmission control, will cause the engine operating point to transfer upwardly along curve 383 toward point S, matching the resistance of the added rimpull load with the engine speed increased to 1760 rpm and delivering 185 horsepower.

Preferably, the operating point will not be allowed to shift down curve 385 toward point R. Rather, further torque requirements at the wheels would be met by the power limiting mode as from point Z' of FIG. 8B, which is a drive train torque curve, while the engine remains at point S. This is accomplished in the microprocessor 140 by terminating the increase of the power match curve 136 with increasing throttle position at the engine speed of point S. Graphically, as in FIG. 4B, the power match curve 136 would flat off at point S into the horizontal segment 136'. Accordingly, the desired engine speed, which is calculated by the microprocessor based on the power lever position and the power match curve, will not increase, even if the power lever is pushed further forward. So the transmission and power lever controls will prevent the actual engine speed from exceeding point S plus the 50 rpm deadband in speed mode. Since the horsepower at point S is the same at point R, it follows that the full horsepower capability of the engine can be realized from a constant horsepower engine without departing from optimum fuel efficiency.

In contrast, to attain maximum horsepower from the engine of FIG. 7A requires departing from maximum fuel efficiency to arrive at point L, the maximum power capability. Since the engine would stay at the latter point upon further increases in load as the transmission in its power limiting mode supplied the additional torque required by the load, the drive train would be required to carry its heaviest loads at less than maximum fuel efficiency. With the engine of FIG. 7A, the designer has to choose between maximum power or maximum fuel economy. However, the power match curve could also be flatted off at point L to minimize the loss of efficiency.

POWER LEVER MOTOR CONTROL—FIGS. 1 and 5

As shown electrically connected by the power cable 81 to the motor control circuit output terminals 379, 381 of the control module 24, a preferred power means is a reversible DC motor 83 which mechanically pivots the power lever 18 into various positions throughout its range of power settings. In series in cable 81, a limit switch L.S. shown normally closed at 139 and a manual switch MS, the bottom switch 137, is closed by the pushbutton to set the governor drive motor in automatic operation. These motor control circuit terminals 379, 381 appear as the output terminals of a B+ supplied, microprocessor controlled motor control circuit 150n to be considered substantially identical to the companion circuit 150m for the swash plate control.

The built-in protection and safeguards described for circuit 150m as it accurately controls the swash plate tilt angle afford the same benefits to the identical circuit 150n as it equally accurately controls the pivot angle of the power lever.

In practice, the microprocessor 140 will have high sensitivity in the power and speed modes and the proportionally moving swash plate actuator 26 will have correspondingly high responsiveness, i.e., in 0.3 seconds, the swash plate will travel from one extreme tilt angle to the opposite extreme compared to the relatively slow power lever motor 83 which may take 10 seconds to achieve full travel. The high responsiveness of the swash plate actuator 26 to change the transmission ratio compared to the slow response of the power lever control motor 83 establishes a priority in the manner in which the control apparatus as a whole adjusts to varying conditions of load and/or desired ground speed. Thus, when a sufficiently large deviation in ground speed from the desired value exists, the control apparatus will simultaneously adjust the transmission ratio, in the power limiting mode described above, as well as the power lever setting to reduce the deviation. Because of the relative response times, the transmission ratio adjustments will bear the brunt of this correction. When the deviation results in an increase of engine speed beyond the desired value, the speed mode of the transmission control will maintain a constant ground speed while the power lever control will correct engine speed deviation, both controls acting relatively independently.

Exhibiting flexibility in the same vein as in its power and speed modes of operation, the control module 24 as shown in FIG. 5 is not confined to any set number of steps or sequence or order for automatic power lever operation, although for ease of understanding, the flow chart approach will now again be used, simply by way of one example and not limitation.

AUTOMATIC POWER CONTROL FLOW CHART—FIG. 6B

FIG. 6B, which illustrates the automatic power lever control logic, interconnects with the transmission control logic of FIG. 6A at the intersection of paths 342 and 358 and through the return path 346. When the automatic power control is activated by the push button switch, the dotted return path 344 of FIG. 6A effectively disappears. So, in that event, the logic follows path 342 through PTO diamond 387 (which represents a separate automatic mode to be discussed below) and interconnecting safety diamonds 382 and 384 to underratio comparison diamond 386. One can see the capability of the microprocessor to constantly monitor the command ratio for every deviation of more than 2 percent below the command ratio for the desired ground speed, i.e., the desired command ratio, that is, 2 percent of the possible range of the transmission ratio.

Continuing by following the path from 386 through interconnecting diamonds 388 and 390, to overspeed comparison diamond 392, one can see the further capability of the microprocessor to constantly monitor actual engine speed for every deviation in speed in excess of 50 rpm above the desired speed being calculated. The mentioned deviations, both ways, permitted by the automatic power control for each power setting establish the previously discussed deadbands 381 and 380 respectively now to be treated in detail.

OPERATION UTILIZING POWER SETTING DEADBAND—FIG. 6B

So long as underratio comparison in diamond 386 by the microprocessor shows the command ratio to be below but within the 2 percent (based on the ratio range) of the desired command ratio determined by the microprocessor, then according to the No answer from comparison diamond 386, the automatic power control will be satisfied and not activate. On the other hand, with the underratio detected as going more than 2 percent below the desired command ratio, the microprocessor logic from diamond 386 follows the Yes path 394 through an interconnecting throttle diamond 396 to the increase throttle block 398. According to the flow chart, therefore, the step represented by the block 398 is for the microprocessor to signal for a greater power setting. So the microprocessor is programmed to run the lever motor to pivot the throttle or power lever 18 for sufficient power increase to eliminate the degree of underratio back to at least within 2 percent of the desired command ratio.

According to the No answer, FIG. 6B, from the overspeed comparison diamond 392, the automatic power control logic remains satisfied so long as the actual engine speed stays within 50 rpm of the desired speed. But with each overspeed in excess of 50 rpm, the microprocessor logic conforms to the Yes path 402 from diamond 392 through interconnecting diamonds 404,408, described below, to throttle decrease block 410. So the microprocessor is programmed to run the lever motor and reduce throttle or power lever 18 until excess overspeed is eliminated down to 50 rpm above the desired engine speed.

FIGURE 6B—PROGRAMMED SAFEGUARDS IN MICROPROCESSOR LOGIC

Figure 3:
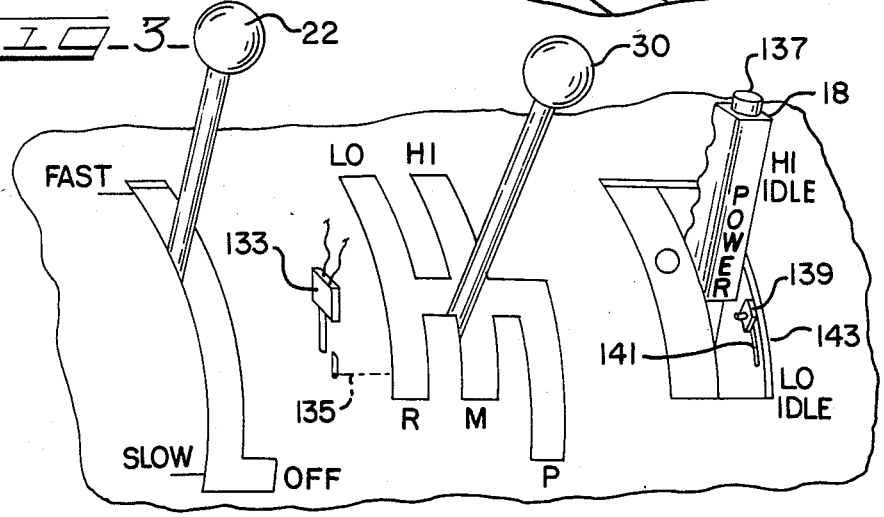
FIG. 3 is an isometric view showing the power train controls including the automatic power lever provided for the tractor operator.

The consecutively connected gear diamond 382 and clutch diamond 384, together with their respective No and Yes paths for the logic involved, are operatively associated respectively with the out-of-neutral switch 133 shown in FIG. 3, and the normally open, clutch pressure switch 97 shown in FIG. 1, both of which are connected by appropriate but unshown input connections to the microprocessor 140. The microprocessor puts the automatic power control in inactive status, when either switch 133 closes to indicate a neutral transmission 28 or switch 97 closes to indicate a disengaged master clutch 92. In either case the logic path is No, from gear diamond 382 or from clutch diamond 384, or both, and so the normal power lever control logic is overruled as it must be because the engine cannot be loaded through the interrupted power train. Otherwise, the automatic power lever control would keep sensing overspeed in the engine running free of load, and keep slowing it down, ultimately to 50 rpm above low idle despite the operator desiring a higher speed, for example, to set the tractor in motion from standstill. A Yes answer in the logic path from gear diamond 382 in conjunction with a Yes answer in the logic path from clutch diamond 384 represents the right combination of conditions for automatic power control, that is, the transmission is in gear and the clutch is engaged. So the power lever requires control, now that the engine is coupled to the load. Of course, in the automatic PTO mode described below, the power lever is controlled even if the drive is interrupted.

There is an operating point, for example, point W on FIGS. 8A or 8B, at which the speed transmission reaches its maximum ratio condition, i.e., a 1:1 ratio producing least effective gear reduction, the sensing of which, as represented by the commanded diamond 388, is interrelated with underratio comparison diamond 386 directly in the latter's No path, and is also interrelated with overspeed comparison diamond 392 by way of the immediately intervening high idle safeguard diamond 390. Therefore, when the underratio function has a satisfied condition (No from 386) sending out no signal, the next-in-logic-sequence commanded ratio diamond 388 will be afforded the Yes path as illustrated leading through high idle diamond 390, path 394, throttle diamond 396, thence to throttle increase block 398; the resulting increased throttle increases the engine speed and causes the speed mode in the microprocessor to react by increasing the gear reduction to maintain constant ground speed, deswashing the speed transmission back from its extreme tilt angularity, thereby providing some range for future reduction in the transmission ratio should conditions make that desirable.

To explain it graphically by returning momentarily to FIG. 8a, with the increase in throttle, the points WXY and the curve between them shifts parallelly upward along the curves 368,372,376. However, since the load on the tractor and the desired ground speed have not changed, the drive train operating point remains in the same position on the graph as before, on the vertical line VW, but is now slightly below a newly established power limiting logic curve WXY (not shown) and is therefore in the speed mode.

The effect of commanded block 388 is limited, on the one hand, by its resolution, i.e., how close does the commanded ratio have to be to the maximum commanded ratio to get a Yes, and, on the other hand, by block 392 which will automatically reduce the power lever setting if the engine speed exceeds 50 rpm over the desired engine speed.

The reason for the requirement that engine speed stays at or below, 2700 rpm, as represented by high idle diamond 390 is to establish maximum engine operating speed which, for the engine in question, is 2700 rpm. So as illustrated, the Yes path from diamond 388 indicating minimum gear reduction requires that engine speed simultaneously be less than the 2700 allowed maximum rpm in order for the Yes path from safeguard diamond 390 to show a call for increased throttle to speed up the engine. Of course, the 2700 rpm could be some number over high idle to prevent transient actuation of diamond 390.

The No path from commanded diamond 388 and the No path from high idle diamond 390 are illustrated to indicate that overspeed logic becomes effective, as represented by overspeed comparison diamond 392, as soon as either one has a No; that is to say, the commanded ratio relationship is compatible with slowing the engine by being less than maximum ratio or, if already at maximum, the (overriding) attainment by the engine of its top allowable operating speed will find full compatibility to an engine being slowed in speed, for whatever reason the programming might call for. Thereupon the microprocessor will apply its overspeed logic to decrease the throttle setting to alleviate the overspeed condition.

The intervening diamond 404 as shown located in FIG. 6B between overspeed diamond 392 and the block 410, representing throttle decrease, evidences that the microprocessor logic requires that the commanded ratio sensed be less than maximum in order for the Yes path from diamond 404 to allow the overspeed control to decrease the throttle. In other words, the overspeed condition is not allowed to throttle down the engine, at the same time that the transmission ratio being monitored by the microprocessor shows the speed transmission to be then running at maximum commanded ratio (least mechanical advantage) while the microprocessor is operating in speed mode.

The rpm diamond 406, representing the engine safeguard logic which protects when the engine is being motored, as by a trailer in a downhill condition such as example VI above, has a No path when engine speed is below 2800 rpm. The Yes path from 406 indicates that the throttle decrease step represented by block 410 goes on automatically until the motoring of the engine reduces to a speed below 2800 rpm.

The No path from overspeed comparison diamond 392 and the No path from swash diamond 404 properly indicate that the motored top speed logic limit becomes effective, as represented by the 2800 rpm diamond 406, as soon as either one is sensed as the first No to occur. That is the overspeed comparison finds compatibility with motored overspeeding by being less than the +50 rpm in excess or, if already in excess by more than the +50 rpm, the (overriding) attainment by the commanded ratio reaching maximum (minimum effective gear reduction ratio) will find full compatibility with motored overspeeding and the need to throttle down the engine. Thereupon the microprocessor as programmed retards (at 410) the power lever to avoid adding fuel to the engine which is being motored thereby enhancing its engine braking.

The reason for throttle monitoring as represented by maximum throttle diamond 396 and by minimum throttle diamond 408 ahead of the powered throttle change blocks 398,410, respectively, can be explained in a few words. The microprocessor logic herein requires no unnecessary act, and so no throttle increase or decrease signals will be allowed when the power lever already occupies the maximum or minimum settings, respectively.

The overspeed comparison and underratio comparison programming described so far has required the microprocessor internally to have a main overspeed circuit and a main underratio circuit, each operating on three counts which correspond to the 50 rpm and 2 percent deviations, for accuracy which has proven satisfactory in the field. Reaching the third count, either upward from power match curve 136, FIG. 4B, or leftward from transmission output speed line VWZ in FIG. 8B means that the deadband 380 or 381 is no longer effective because it has been crossed. So there will be automatic power control with any further deviation in engine or transmission output speed respectively, to bring the operating point back to the adjacent edge of the deadband on the graph.

From the foregoing it can be appreciated that the automatic power control is augmental to the much more sensitive power limiting mode or speed mode, both operating from four principal signals. The power lever 18 is the source of the first signal because its setting is being constantly monitored, and the speed lever is the source of the second signal because its setting, too, is being constantly monitored. The third signal developed is proportional to the common engine-transmission-input speed, and these three signals enable the microprocessor accurately to dictate how the transmission speed reduction ratio is changed in response to a speed error detected between the third speed signal and a desired engine speed signal computed as a constant recalculation by the microprocessor based on the first signal, throttle position. The fourth signal, of course, is the conveniently taken transmission output speed value digitally necessary in the computer for determining the commanded ratio which the changed speed reduction ratio must match and its deviation from the desired commanded ratio.

Then, from a less sensitive and less responsive area of operation, not only dominated by transmission control priority requirements but also dominated by a conspicuous deadband system, the automatic power control comes on and, due to the same four signals, dictates how the automatic power control is to change the power lever setting in response to the speed band error or the command ratio error.

Besides applying torque to the rest of the power train including the drive axles illustrated herein, the engine of the present power train separately but equally effectively drives the conventional single speed or dual speed power take-off (PTO) shaft of the tractor, not shown, at a speed proportional to engine speed. Although, the control module does not directly affect the PTO output, the effect of the PTO and air conditioning and other parasitic loading about the tractor is included in the control module's operation. In other words, the two sensors of speed and other sensors hereof take into account all engine loading for engine optimization automatically with the sequential transmission ratio setting and automatic power setting. However, in achieving automatic power setting operation, the system may cause the engine speed and thus, the PTO speed, to drop below that considered necessary for efficient PTO operation. As a compromise, to accommodate relatively constant speed PTO operation, another automatic PTO mode of operation is provided.

The PTO mode of operation is engaged by a toggle switch 389 (FIG. 5) connected to the microprocessor 140 conveniently mounted on the dashboard or elsewhere in the operator's compartment. The other hardware necessary for automatic PTO mode has been described. However, it is necessary to return to the FIG. 6B flow chart for an example of how the microprocessor 140 is programmed to accomodate the automatic PTO mode. In that chart, before the gear and clutch diamonds 382, 384, the PTO switch diamond 387 was encountered but previously had a NO. In the presently described automatic PTO mode, the answer would be YES leading to the PTO underspeed comparison diamond 391 and if that provides a NO, the PTO overspeed comparison diamond 393. In both diamonds, the PTO speed is a predetermined (but possibly adjustable) desired engine operating speed providing satisfactory PTO operation.

Thus, if the engine speed is less than the desired PTO speed by more than 50 rpm, a YES will result at diamond 391 leading to increase throttle block 398, thus advancing the power lever 18 until the PTO underspeed condition is corrected. On the other hand, if the engine speed is greater than the desired PTO speed plus 50 rpm, a YES answer will result at diamond 393 leading to decrease throttle block 410 and so the power lever will be retarded until the PTO overspeed condition is corrected. Thus, a 100 rpm deadband within which the microprocessor will maintain the PTO speed results from this mode.

Because the PTO diamond 397 is before the gear and clutch diamonds 382 and 384, the PTO mode will be effective even when the tractor is stationary as is desirable for some PTO operation. However, if the tractor is being operated while in PTO mode, the transmission logic in both power limiting mode and speed mode will continue to function as before to attempt to operate the engine at optimum fuel efficiency or at constant ground speed. Additionally, if the power match curve 136 had been terminated, as at point S, actuation of the PTO switch would raise the termination point to the top of the PTO speed deadband, thus providing a correct desired engine speed for block 332 (FIG. 6A) of the transmission control logic. The operation would thus be exactly the same as that illustrated in FIG. 8A and described in Examples I-VI above, except that the engine speed will always be maintained in the PTO deadband, which may result in the tractor operating in the less fuel efficient speed mode during a larger portion of its operating cycle.

AUTOMATIC POWER LEVER—FIGS. 9-11

As described above, the power lever 18, in addition to its automatic operation function, also is an intermediate manual control which overrides the governor motor drive 83 to adjust the tension setting mechanism of the engine governor 19. This requires that the operator set the handle in manual or in automatic mode to deactivate or to bring on the automatic power control whichever he desires.

A preferred means to accomplish this is the power lever assembly shown at 18 in FIGS. 9—11 mounted in a slot in the console housing 143 to pivot on a fixed axis 412 defined by the output shaft 414 of the governor motor drive 83. A slip clutch 416 disposed about shaft 414 has a small diameter hub 418 and, axially therefrom, enlarges into a split clamp with opposite jaws 420 and 422 drawn together by an adjusting bolt assembly 424.

A deformable tube of wear surface material 426 fits between the clutch 16 and shaft 414, to provide a friction drive from the shaft 414 to the clutch hub 418 and, to interrupt and prevent any drive from hub 418 to the rockshaft 414 upon a torque overload in an amount predetermined by the adjusting bolt assembly 424.

The power lever 18 is a consolidated electromechanical control assembly including three major elements and certain subassemblies. The first element is the governor lever proper, a two arm lever 428 having a central axial opening 430, disposed on clutch hub 418 and welded thereto, an upper arm portion 428 and a lower arm portion 432, the latter being connected by a pivot joint to governor linkage 434. As the lever 428 pivots about axis 412 to longitudinally shift the linkage in the opposite directions indicated, the latter will appropriately adjust the tension setting mechanism 19 of the engine speed governor 19.

An outermost, hollow plastic handle 436 is disposed about the governor lever 428. It is traversed lengthwise by a slot 438 of narrow or thin cross section which emerges within the lever's hollow interior into a large chamber 440 leading to an open end 442 at the bottom of the handle. The bottom end 442 accepts, with considerable clearance, the governor lever 428 which projects into the large chamber 440 and which carries a fixed microswitch 444 with an activating plunger disposed in mutual confrontation to the handle's open bottom end 442. An internal crosspin 445 fixed in the handle fulcrums it to the governor lever 428, and two pairs of gapped stops 446 and a pair of centering springs 448 and 450 floatingly guide and restrictedly limit movement of the handle 436 at the bottom end 442 as it transversely tilts on the governor lever about the fulcrum crosspin 445.

The third element of the power lever assembly 18 is found in the button switch 137, which is actually an assembly comprising the pushbutton 452, disposed in a cylinderical spring socket 454 intersecting the slot 438 in the handle and holding a button return spring 456, and a flat metal switch lever 458 squarely bent at the bottom so as to have an operating end flange 460 confronting the activating plunger of microswitch 444 and, at the top, carrying the pushbutton 452.

The flat metal switch lever 458 straddles the crosspin 445 by reason of a surrounding clearance hole 462 which is punched in the flat metal. The sides of the hole 2 act as stops for limiting transverse tilting of the switch lever at its operating end 460 but with less amplitude than the limits restricting the handle 436. A fixed pin 464 on the governor lever is received in a narrow longitudinal slot 466 in the switch lever and is the fulcrum for the movement of the switch lever relative to the governor lever. The pin 464 limits the sliding movement by respectively engaging the bottom and top of the slot 466.

At outset of downsliding movement of the flat switch lever 458 as it is guided within and in the plane of the narrow or thin cross section of the lever slot 438, a latch tab shoulder 468 (FIGS. 10 and 11) on governor lever 428 intervenes in the path of, and presents a ramp in fixed alignment with, an engaging, diagonally upwardly projecting, spring latch tab 470 captured from the material of and inturned from the flat metal of the switch lever. During continuation of such movement, when the operating end flange 460 is forced from its solid line, switch open position into the switch closed position, which depresses the actuating plunger of microswitch 444 as indicated by the broken lines 460a, the operating end of the switch lever has a self-latching function; this function is due to the spring catch effect of the interengaging tab and shoulder 470,468. A self-unlatching function, automatically occurring without conscious effort when the operator grasps the handle 436, is hereinafter described in connection with the illustration of FIG. 11.

The microprocessor monitors the power lever position by the potentiometer 144 described above. The power lever further has a pinion 472 meshing with a gear sector 474 carried by the clamp portion of the slip clutch 416 whose pivot position corresponds with the power lever tilt position. The governor motor drive includes shaft 414 with its axis fixed as aforesaid because it has one of the opposite ends journalled on such axis 412 in a stationary outboard bearing 476 and the other journalled in the output of a fixed, reduction gearbox 478. A governor motor 480 drives a train of gears (not shown) within the gearbox 478 to set and hold the position of the output shaft 414 and the power lever 18, too, if the friction clutch is not overcome. The gearbox is incapable of being driven in the opposite direction through the slip clutch 416.

The output terminal 379, of the motor drive circuit 150n is connected to a button switch branch of power cable 81 and the button switch indicated therein at 137 enables the operator by hand to set the power control on automatic when the contacts take the broken line, switch closed position, and then by hand to set it on manual when the contacts take the switch open position as shown by a solid line. The lower one 381 of the output terminals of the circuit 150n as viewed in FIG. 10 is connected to a diode and switch branch in which a diode 482 is in parallel with the normally closed limit switch 139. The switch 139 has a trip head 484 by which the power lever 18 trips open and holds open the switch contacts as soon as and as long as the lever is in a decreased power setting opposite to the limit switch position as shown in FIG. 3.

The motor 480 of the drive 83 can be energized to provide the automatic power control desired only in the event that the button switch 137 is set on automatic to complete the circuit to terminal 379. In that event, when the microprocessor commands the solid state reversing switch of circuit 150n to impress the terminal 381 with the positive (B+) voltage, current readily flows through the diode 482 to terminal 381, and likewise flow through the closed switch 139 to terminal 381. So the power lever 18 advances, and irrespective of whether the switch 139 in its limiting function has been tripped open or not.

But the diode 482 does not permit any appreciable current flow in reverse. So when terminal 379 is the one switched to positive by the command of the microprocessor and when a decreasing power setting by the lever 18 has tripped open the switch 139, the then-negative output terminal 381 is in effect open circuited and the motor 480 is deenergized. In other words, the power lever 18 needs to be off the limit switch 137, in order ever to move automatically in the power decreasing direction toward the switch 139.

A convenient illustration of the operation of the power lever 18 throughout the various stages of tractor operation will begin with a consideration of FIG. 7A. Assume that the tractor is operating at point N which roughly corresponds to point W in FIGS. 8A and 8B. If the tractor is operating without automatic power lever control, increases in the tractor load will cause the tractor to follow the curve WXY of FIG. 8A while the engine operating point will remain at point N of FIG. 7A. Conversely, if the load were lightened from the original point N, W, the tractor would operate at constant speed between point V and W of FIG. 8A while the engine operating point would leave point N and, being on the governor, would follow a curve approximately parallel to the governor droop curve intersecting 1750 rpm in FIG. 7A to a new operating point N'. However, if from point N, the power lever were pushed forward, or if it were automatically moved forward by engagement of the automatic PTO mode described above, to some higher setting, the engine operating would shift from point N parallel to the constant horsepower lines of FIG. 7A to a new operating point N", because the tractor horsepower requirements did not change, while the tractor operating point would remain at W.

Assume now at point N, the operator decides to let the tractor do the driving, so to speak, to prevent operating at poor efficiency points, such as N", and wishes to place the power lever under automatic control. To do so he disciplines himself to a hands-off policy other than to depress the thumb button switch 137 which self-latches depressed in switch closed position. So the microswitch 444 activates the automatic power control.

Presume enough added soil resistance to shift the condition of operation to a point M representing the intersection of the minimum BSFC curve and the 160 curve bp. The hands-off operator contents himself at this point to watch only while the power lever 18 is automatically pivoted by its drive 83 into a correspondingly advanced, increased power position. The tractor transmission, which is now operating according to FIG. 8B, also responded to the increased load, first in power limiting mode and then in speed mode to shift the operating point up somewhere between point H and Z'.

Then, the operator arbitrarily and manually pushes the power lever 18 out of a normally maintained minimum BSFC position as point M represents. To do so, he moves the power lever assembly 18 to the extreme of its maximum power position, wide open throttle. After a point of imperceptible predetermined initial movement of advance of the parallel handle 436 and switch lever 458 at their swinging or button end in the power increase direction (FIG. 9), at which point the preloaded centering spring 48 has collapsed allowing the gap of adjacent stop 446 to bottom out (FIG. 11), the handle 436 and lever 458 will have independently fulcrummed on the still stationary governor lever 428. However, the switch lever 458 because of its more remote pivoting at 464 will force its operating end flange 460 to pivot with more amplified movement compared to the corresponding end 442 of the handle 436.

FIG. 11 illustrates that precise point in the automatic-to-manual operation. The initial relative lever xovement at their swinging end, imperceptible though it be at 442 for the power lever, reflects itself sufficiently to kick the latch tab 470 (shown in phantom) of switch lever 458 transversely completely out of line with the blocking tab shoulder 468 on the governor lever 428. Consequently self-unlatching automatically when the handle is first grasped, the thus tripped-open button switch 137 is immediately restored by its return spring 456 from its relative tilt to the button-out, switch open, manual position as shown in solid lines in FIGS. 9 and 10. The fit of pushbutton 452 in handle socket 454 affords clearance not only for free sliding but also for its comparatively exaggerated tilt relative to the handle 436 and lever 428.

At the same time the governor xotor drive 83 is deenergized, and the governor lever 428 jointly responds to the continuing movement of handle 436 toward wide open throttle. The operator has thus both manually and electrically overriden the automatic power control. The engine operating point thus moves from point M at constant horsepower to the operating point M' on the wide open throttle governor curve but at a considerably sacrifice of added fuel consumption, appreciable if sustained.

To this point the implicit assumption has been that the hand setting force Fo. has all occurred in the power increase direction as indicated by the arrow in FIG. 11. It is evident that self-unlatching at 468,470 just as readily takes place alternately when spring 450 collapses with reversal of the hand force Fo. to its power decrease direction, not shown.

To be restored to the minimum BSFC operating conditions, the system will require the operator to repeat the cycle of thumb depression at 452 and hands-off. Now under automatic power lever control, motor 480 pivots the power lever 18 from wide open throttle into a correspondingly retarded, decreased power setting position where it stops, delivering fuel under nearminimum BSFC conditions. The engine operating point thus shifts back along the constant horsepower line to a point 50 rpm above point M, at which point the overspeed deadband prevents further throttle movement.

The trip head of the adjustable limit switch 139 prevents the automatic power control from setting the engine at too low a governed speed to suit the operator, who may want to quickly apply full power. Setting the head 484 will ensure that the engine never goes below the corresponding minimum speed he feels comfortable with, despite being in automatic power mode to keep the operation to minimum BSFC. Such minimum speed could also have been determined in the microprocessor by flatting-off the lower end of the power match curve 136 at that speed.

It is evident the invention applies equally to engine-transmission power trains with other continuously variable transmissions (CVT's) including the lower horsepower, belt drive type, continuously variable mechanical transmissions. Also the present principles apply with equal force to further engine-CVT power trains, hydrostatic and hydromechanical and others. Although perhaps not ideal for maintaining the engine exactly on the least BSFC curve, the invention can also be applied to step change power shift transmissions. Indeed, given enough gears, a power shift transmission eventually approaches a continuously variable transmission

What is claimed is:

1. Efficiency control for an engine-transmission power train of a fuel-powered vehicle of the type including an engine having power control means, a fixed range transmission having a plurality of fixed, specific reduction rations providing corresponding speed ranges and a variable range transmission providing a continuously variable range of speed reduction ratios, said variable range transmission being equipped with transmission pump and motor hydraulic units with variable displacement to vary their speed ratio, and electrically controlled hydraulic means to vary such displacement and correspondingly vary the variable transmission output speed and torque, and variable transmission including manual means for varying the variable transmission output speed and torque comprising:

a command signal generator for connection to the electrical hydraulic means to provide thereto a main command signal for setting desired output speed of the transmission by varying the pump-and-motor speed-ratio of same as it is driven under engine power;

means for storing in a memory a predetermined consecutive series of desired engine speed values which result in substantially minimum specific fuel consumption for a range of engine power setting;

first means connected to the memory for generating a reference command indicative of that particular engine speed value which is desired corresponding to the actual engine power setting;

second means for generating a second signal indicative of the actual engine speed;

third means for generating a third signal indicative of the setting of the manual means for varying the variable transmission output speed and torque;

said first and second and third means having connected to the signal generator for modifying the main command signal automatically, in response to a deficiency of one of said reference command and second signal compared to the other; and a power control lever for adjusting the power level of an engine, said engine having a power control means, comprising the assembly of (1) a governor lever pivotally mounted on a fixed axis shaft, said governor lever having an end connected by linkage to said engine power control means;

(2) an external handle disposed about a portion of said governor lever and a parallel switch lever disposed within said handle, said handle and said switch lever being mutually connected at their swinging end remote from the shaft for their relative movement in a sliding direction on a somewhat restricted basis and for relative tilting in a transverse direction on a more restricted basis, said switch lever having an opposite, self-latching/unlatching end for operating a switch; said power handle having an opposite end fulcrummed on said governor lever to pivot with limited motion on a swing center near the operating end of the switch lever and the latter fulcrummed on said governor lever to pivot with less limited motion on a swing center remote to its operatng end, and being so disposed that such remote swing center forces the operating end of the switch lever to pivot with amplified movement compared to said corresponding opposite end of the handle when the two undertake conjoint motion at their swinging end.

2. The invention according to claim 1, the switch lever characterized by:

confronting, at its operating end, the plunger of a switch to be depressed thereby and associated with the governor lever, said switch lever carrying at the swinging end a push button, said push button projecting beyond the corresponding swinging end of the handle and affording an in-sliding actuation for the switch lever to a switch-closed position of the operating end holding the switch plunger depressed.

3. The invention according to claim 2, further comprising:
- a fixed latching tab shoulder on the governor lever lined up in the path of a latching tab on the operating end of the switch lever for their mutual latching engagement when the switch lever under in-sliding actuation assumes its switch-closed position; and
- a retracting spring biasing the switch lever to withdraw from the switch plunger immediately the amplified mechanical leverage movement relatively deflects the shoulder and tab out of line sufficiently to disengage and unlatch the switch plunger at its operating end.

4. The invention according to claim 1, further comprising:
- a hub carrying the governor lever supported on said shaft, and coupled thereto through a slip clutch drive which, without slipping, rotates the governor lever, switch lever, and handle into a corresponding position of power adjustment and which, by slipping, accommodates conjoint manual rotation of said levers into positions of adjustment without shaft movement.

5. The invention according to claim 4, further characterized by:
- said parallel switch lever having an in-sliding position relative to said hub;
- said parallel switch lever and said governor lever having interposed aligned tab means latchingly engageable for said self-latching/unlatching lever end to automatically latch the switch lever into its in-sliding position; and
- said parallel switch lever effective with amplified movement compared to the handle, all in said transverse direction, to deflect the tab means out of engaged alignment and unlatch said self-latching/unlatching lever end automatically upon predetermined initial conjoint motion of the two at their swinging end.

6. The invention according to claim 5, the parallel switch lever further characterized by:
- confronting, at its self-latching/unlatching end, a switch arranged with an actuator to be depressed thereby and associated with the governor lever;
- said parallel switch lever carrying at the swinging end a push button, said push button projecting beyond the corresponding swinging end of the handle and depressible to bring the self-latching/unlatching lever end into in-sliding position so as to automatically latch holding the switch actuator depressed and held by latched engagement of the tab means.

7. The invention according to claim 1 further comprising:
- mounting means supported on a shaft and mounting the governor lever thereon;
- a governor motor drive to the shaft; and electrical means appropriately effective to reversibly operate the governor motor drive, shaft, and the governor lever automatically in response to an appropriately programmed microprocessor;
- said governor lever mounting means comprising a slip clutch rendering the handle effective as an intermediate hand control over the governor lever and engine power control means, so as to be overcontrolling and independent of the automatic operation of the electrical means.

8. The invention according to claim 7, additionally comprising:
- operator operated means associated with the handle for deenergizing the automatic speed-sensing electrical means whenever the latter is resorted to as the intervening hand control.

* * * * *